United States Patent
Machida et al.

(10) Patent No.: US 10,690,896 B2
(45) Date of Patent: Jun. 23, 2020

(54) VARIABLE MAGNIFICATION OPTICAL SYSTEM, OPTICAL DEVICE, AND PRODUCTION METHOD FOR VARIABLE MAGNIFICATION OPTICAL SYSTEM

(71) Applicant: NIKON CORPORATION, Minato-ku, Tokyo (JP)

(72) Inventors: Kosuke Machida, Tokyo (JP); Takeshi Suzuki, Yokohama (JP); Takeru Uehara, Ageo (JP)

(73) Assignee: Nikon Corporation, Tokyo (JP)

( * ) Notice: Subject to any disclaimer, the term of this patent is extended or adjusted under 35 U.S.C. 154(b) by 230 days.

(21) Appl. No.: 15/576,805

(22) PCT Filed: May 26, 2016

(86) PCT No.: PCT/JP2016/065603
§ 371 (c)(1),
(2) Date: Mar. 6, 2018

(87) PCT Pub. No.: WO2016/194774
PCT Pub. Date: Dec. 8, 2016

(65) Prior Publication Data
US 2018/0307012 A1    Oct. 25, 2018

(30) Foreign Application Priority Data

May 29, 2015 (JP) .................. 2015-110078

(51) Int. Cl.
*G02B 15/20* (2006.01)
*G02B 13/18* (2006.01)
(Continued)

(52) U.S. Cl.
CPC ............. *G02B 15/20* (2013.01); *G02B 13/04* (2013.01); *G02B 13/18* (2013.01); *G02B 15/177* (2013.01);
(Continued)

(58) Field of Classification Search
CPC ............. G02B 9/00; G02B 9/64; G02B 13/04
(Continued)

(56) References Cited

U.S. PATENT DOCUMENTS

| | | | | |
|---|---|---|---|---|
| 5,400,182 A | * | 3/1995 | Chiba | ................. B29C 35/0888 |
| | | | | 264/1.7 |
| 2014/0036137 A1 | * | 2/2014 | Inoue | ..................... G02B 15/15 |
| | | | | 348/345 |
| 2014/0085513 A1 | * | 3/2014 | Tashiro | .................. G02B 13/18 |
| | | | | 348/240.3 |

FOREIGN PATENT DOCUMENTS

| | | |
|---|---|---|
| JP | 2006-337647 A | 12/2006 |
| JP | 2011-150240 A | 8/2011 |

(Continued)

OTHER PUBLICATIONS

International Search Report from International Patent Application No. PCT/JP2016/065603, dated Jul. 12, 2016.

*Primary Examiner* — Robert E. Tallman
(74) *Attorney, Agent, or Firm* — SGPatents PLLC

(57) ABSTRACT

Comprising, in order from an object side: a first lens group G1 having negative refractive power; a second lens group G2 having positive refractive power; a third lens group G3 having negative refractive power; a fourth lens group G4 having positive refractive power; a fifth lens group G5 having negative refractive power; and a sixth lens group G6 having positive refractive power;
upon varying magnification, air distances between the neighboring lens groups G1-G6 being varied; and
a predetermined conditional expression being satisfied, thereby providing a variable magnification optical system which has excellent optical performance, an optical apparatus, and a method for manufacturing a variable magnification optical system.

19 Claims, 12 Drawing Sheets

(51) Int. Cl.
  *G02B 13/04* (2006.01)
  *G02B 27/64* (2006.01)
  *G02B 15/177* (2006.01)
  *G02B 27/00* (2006.01)

(52) U.S. Cl.
  CPC ....... *G02B 27/0025* (2013.01); *G02B 27/646* (2013.01)

(58) Field of Classification Search
  USPC ....... 359/682, 745, 749–752, 754, 756, 757, 359/676, 677, 680
  See application file for complete search history.

(56) References Cited

FOREIGN PATENT DOCUMENTS

| | | |
|---|---|---|
| JP | 2014-032358 A | 2/2014 |
| JP | 2014-041222 A | 3/2014 |
| JP | 2014-052413 A | 3/2014 |
| JP | 2014-063025 A | 4/2014 |
| JP | 2016-009113 A | 1/2016 |

\* cited by examiner

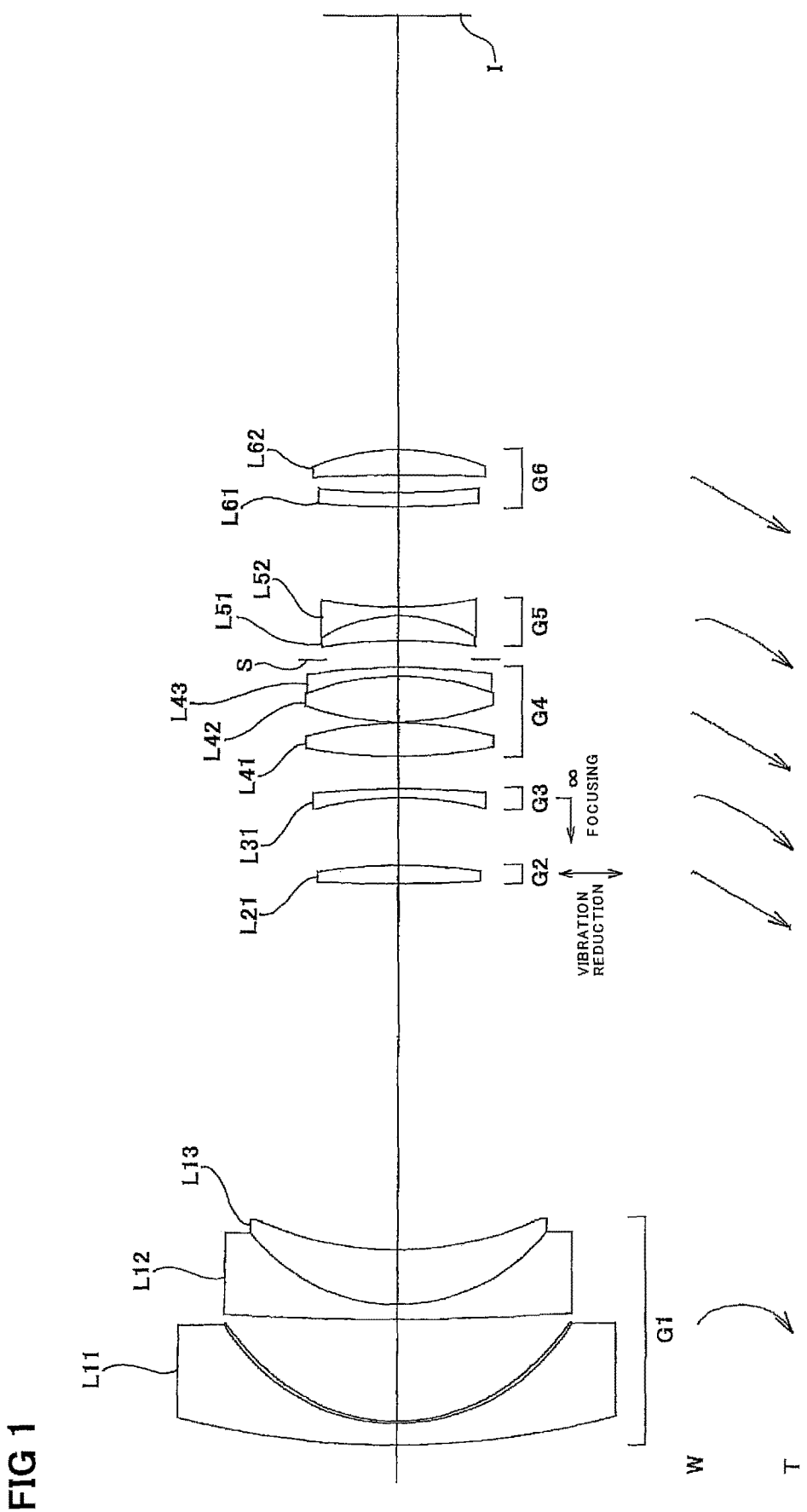

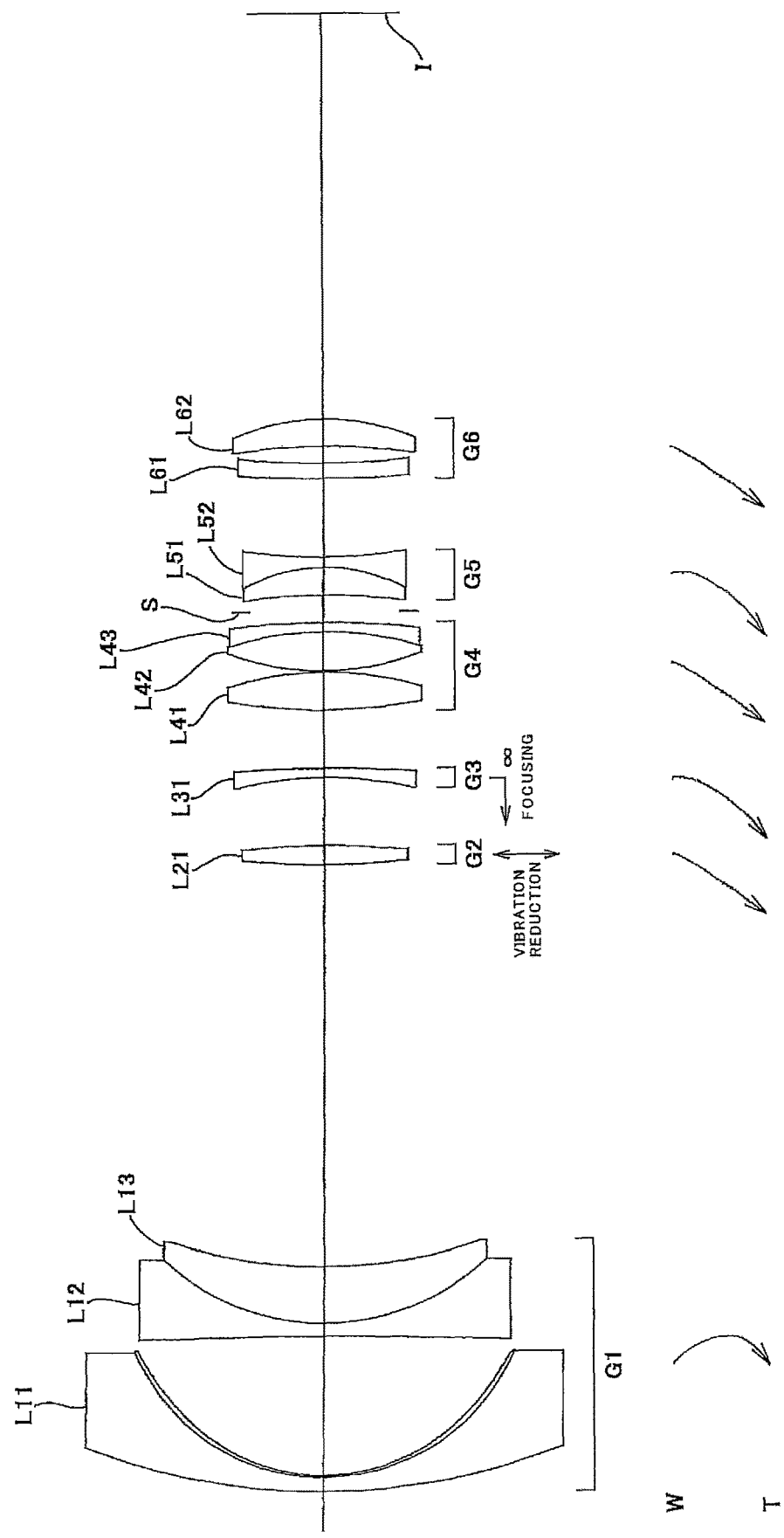

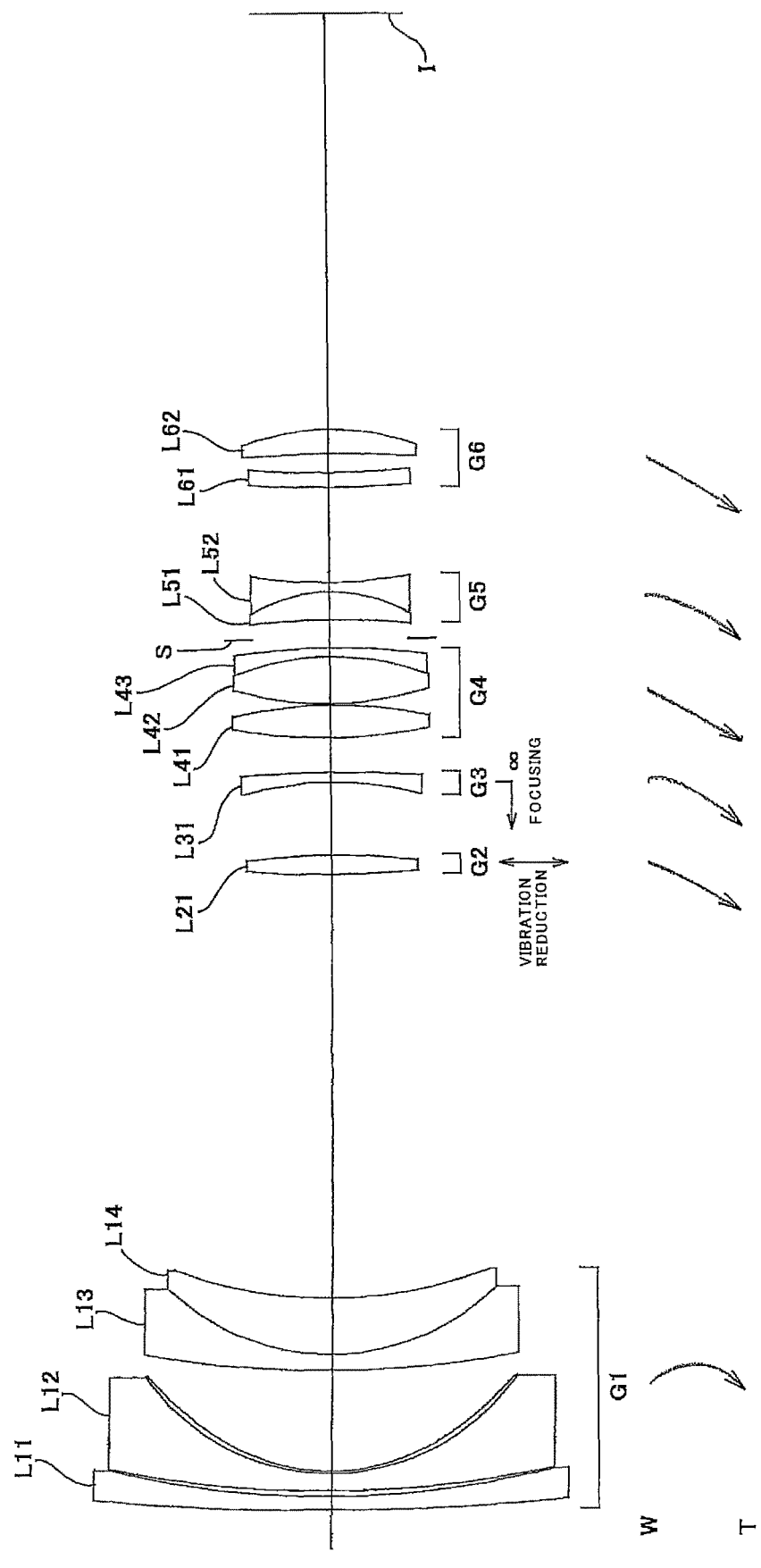

VARIABLE MAGNIFICATION OPTICAL SYSTEM, OPTICAL DEVICE, AND PRODUCTION METHOD FOR VARIABLE MAGNIFICATION OPTICAL SYSTEM

TECHNICAL FIELD

The present invention relates to a variable magnification optical system, an optical device, and a production method for the variable magnification optical system.

BACKGROUND ART

There has been proposed a variable magnification optical system suitable for a photographing camera, an electronic still camera, a video camera or the like, for example, in Japanese Patent application Laid-Open No. 2014-32358.

PRIOR ART REFERENCE

Patent Document

Patent Document 1: Japanese Patent application Laid-Open Gazette No. 2014-32358

SUMMARY OF THE INVENTION

According to a first aspect of the present invention, there is provided a variable magnification optical system comprising, in order from an object side: a first lens group having negative refractive power; a second lens group having positive refractive power; a third lens group having negative refractive power; a fourth lens group having positive refractive power; a fifth lens group having negative refractive power; and a sixth lens group having positive refractive power;

upon varying magnification, air distances between the neighboring lens groups being varied; and the following conditional expression being satisfied:

$$0.30 < (-fA)/fB < 0.60$$

where fA denotes a focal length of a lens group disposed at a most object side, and fB denotes a focal length of a lens group disposed at a most image side.

According to a second aspect of the present invention, there is provided a method for manufacturing a variable magnification optical system comprising, in order from an object side: a first lens group having negative refractive power; a second lens group having positive refractive power; a third lens group having negative refractive power; a fourth lens group having positive refractive power; a fifth lens group having negative refractive power; and a sixth lens group having positive refractive power;

upon varying magnification, air distances between the neighboring lens groups being varied; and the following conditional expression being satisfied:

$$0.30 < (-fA)/fB < 0.60$$

where fA denotes a focal length of a lens group disposed at a most object side, and fB denotes a focal length of a lens group disposed at a most image side.

BRIEF DESCRIPTION OF THE DRAWINGS

FIG. 1 is a sectional view showing a variable magnification optical system in a wide angle end state according to the First Example.

FIGS. 2A, 2B and 2C are graphs showing various aberrations of the variable magnification optical system according to the First Example upon focusing on an infinite distance object, in which FIG. 2A shows various aberrations in the wide-angle end state, FIG. 2B shows various aberrations in an intermediate focal length state, and FIG. 2C shows various aberrations in a telephoto end state.

FIG. 3 is a sectional view showing a variable magnification optical system in a wide angle end state according to the Second Example.

FIGS. 4A, 4B and 4C are graphs showing various aberrations of the variable magnification optical system according to the Second Example upon focusing on an infinitely distant object, in which FIG. 4A shows various aberrations in the wide-angle end state, FIG. 4B shows various aberrations in an intermediate focal length state, and FIG. 4C shows various aberrations in a telephoto end state.

FIGS. 6A, 6B and 6C are graphs showing various aberrations of the variable magnification optical system according to the Third Example upon focusing on an infinite distance object, in which FIG. 6A shows various aberrations in the wide-angle end state, FIG. 6B shows various aberrations in an intermediate focal length state, and FIG. 6C shows various aberrations in a telephoto end state.

FIGS. 8A, 8B and 4C are graphs showing various aberrations of the variable magnification optical system according to the Fourth Example upon focusing on an infinitely distant object, in which FIG. 8A shows various aberrations in the wide-angle end state, FIG. 8B shows various aberrations in an intermediate focal length state.

FIG. 9 is a sectional view showing a variable magnification optical system in a wide angle end state according to the Fifth Example.

FIGS. 10A, 10B and 10C are graphs showing various aberrations of the variable magnification optical system according to the Fifth Example upon focusing on an infinite distance object, in which FIG. 10A shows various aberrations in the wide-angle end state, FIG. 10B shows various aberrations in an intermediate focal length state, and FIG. 10C shows various aberrations in a telephoto end state.

EMBODIMENTS FOR CARRYING OUT THE INVENTION

Figure 2A:
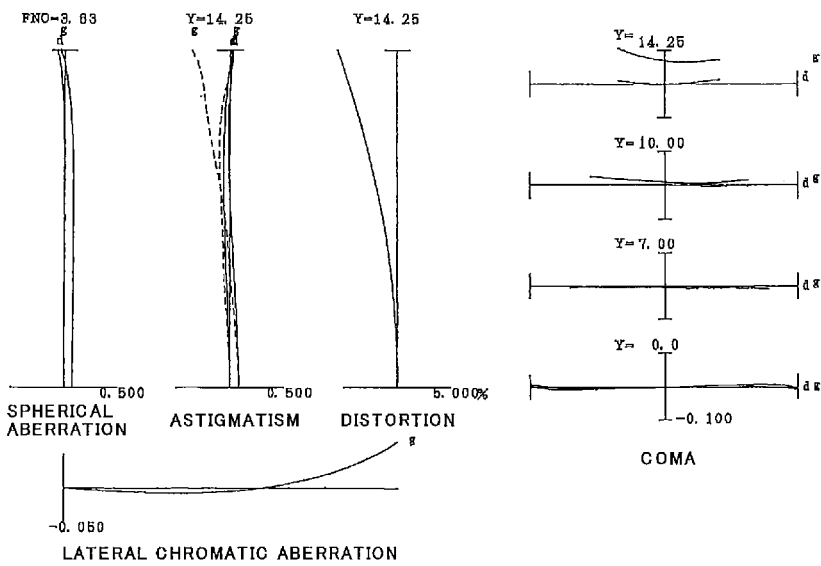

The variable magnification optical system, the optical apparatus and the method for manufacturing the variable magnification optical system according to an embodiment of the present application is explained below.

The variable magnification optical system according to the present embodiment comprises, in order from an object side: a first lens group having negative refractive power; a second lens group having positive refractive power; a third lens group having negative refractive power; a fourth lens group having positive refractive power; a fifth lens group having negative refractive power; and a sixth lens group having positive refractive power;

upon varying magnification, air distances between the neighboring lens groups being varied; and the following conditional expression (1) being satisfied:

$$0.30 < (-fA)/fB < 0.60 \qquad (1)$$

where fA denotes a focal length of a lens group disposed at a most object side, and fB denotes a focal length of a lens group disposed at a most image side.

The conditional expression (1) defines the focal length of the lens group disposed at the most image side relative to the focal length of the lens group disposed at the most object side.

The variable magnification optical system according to the present embodiment is capable of, while making the optical system compact, correcting superbly curvature of field and spherical aberration in the telephoto end state, by satisfying the conditional expression (1).

When the value of (−fA)/fB is equal to or falls below the lower limit value of the conditional expression (1), the focal length of the lens group disposed at the most object side becomes small and the focal length of the lens group disposed at the most image side becomes large. As a result, it becomes difficult to correct spherical aberration in the telephoto end state. Meanwhile, in order to attain the advantageous effect of the present embodiment surely, it is preferable to set the lower limit value of the conditional expression (1) to 0.40.

On the other hand, when the value of (−fA)/fB is equal to or exceeds the upper limit value of the conditional expression (1), the focal length of the lens group disposed at the most object side becomes large, and the focal length of the lens group disposed at the most image side becomes small. As a result, the entire length of the variable magnification optical system according to the present embodiment becomes large, and it becomes difficult to correct curvature of field. Meanwhile, in order to attain the advantageous effect of the present embodiment surely, it is preferable to set the upper limit value of the conditional expression (1) to 0.52.

With configuring as described above, it is possible to realize a variable magnification optical system which has superb optical performance.

Further, in the variable magnification optical system according to the present embodiment, it is preferable that the following conditional expression (2) is satisfied:

$$0.40 < (-fC)/fB < 0.72 \qquad (2)$$

where fC denotes a focal length of a second lens group counted from the image side.

The conditional expression (2) defines the focal length of the lens group disposed at the most image side relative to the focal length of the second lens group counted from the image side.

The variable magnification optical system according to the present embodiment is capable of correcting superbly curvature of field in the wide angle end state and variation in coma aberration upon varying magnification, by satisfying the conditional expression (2).

When the value of (−fC)/fB is equal to or falls below the lower limit value of the conditional expression (2), the focal length of the second lens group counted from the image side becomes small, and the focal length of the lens group disposed at the most image side becomes large. As a result, it becomes difficult to correct curvature of field and coma aberration in the wide angle end state. Meanwhile, in order to attain the advantageous effect of the present embodiment surely, it is preferable to set the lower limit value of the conditional expression (2) to 0.48.

On the other hand, when the value of (−fC)/fB is equal to or exceeds the upper limit value of the conditional expression (2), the focal length of the second lens group counted from the image side becomes large, and the focal length of the lens group disposed at the most image side becomes small. As a result, it becomes difficult to correct variation in coma aberration upon varying magnification. Meanwhile, in order to attain the advantageous effect of the present embodiment surely, it is preferable to set the upper limit value of the conditional expression (2) to 0.70.

Further, in the variable magnification optical system according to the present embodiment, it is preferable that the following conditional expression (3) is satisfied:

$$0.20 < fD/fB < 0.50 \qquad (3)$$

where fD denotes a focal length of a third lens group counted from the image side.

The conditional expression (3) defines the focal length of the lens group disposed at the most image side relative to the focal length of the third lens group counted from the image side.

The variable magnification optical system according to the present embodiment is capable of correcting superbly curvature of field in the wide angle end state and variation in coma aberration upon varying magnification, by satisfying the conditional expression (3).

When the value of fD/fB is equal to or falls below the lower limit value of the conditional expression (3), the focal length of the third lens group counted from the image side becomes small, and the focal length of the lens group disposed at the most image side becomes large. As a result, it becomes difficult to correct curvature of field and coma aberration in the wide angle end state. Meanwhile, in order to attain the advantageous effect of the present embodiment surely, it is preferable to set the lower limit value of the conditional expression (3) to 0.265.

On the other hand, when the value of fD/fB is equal to or exceeds the upper limit value of the conditional expression (3), the focal length of the third lens group counted from the image side becomes large and the focal length of the lens group disposed at the most image side becomes small. As a result, it becomes difficult to correct variation in coma aberration upon varying magnification. Meanwhile, in order to attain the advantageous effect of the present embodiment surely, it is preferable to set the upper limit value of the conditional expression (3) to 0.495.

In the variable magnification optical system according to the present embodiment, it is preferable that the third lens group having negative refractive power is moved as the focusing lens group. With taking this configuration, in the variable magnification optical system according to the present embodiment, it is possible to make an outer diameter of the focusing lens group relatively small and reduce the number of lenses of the same. Accordingly, it is possible to make the variable magnification optical system according to the present embodiment compact in size and light in weight and also to make focusing operation quiet. Further, since focusing is conducted by the focusing lens group having negative refractive power, it is possible to correct superbly variations in spherical aberration, curvature of field and the like upon focusing.

Further, in the variable magnification optical system according to the present embodiment, it is preferable that the lens group disposed at the most object side consists of two or three lens components. With such a configuration, it is possible to correct various aberrations, such as particularly spherical aberration, curvature of field and distortion, and at the same time to make the variable magnification optical system according to the present embodiment compact.

Further, in the variable magnification optical system according to the present embodiment, it is preferable that the lens group disposed at the most object side comprises a lens component comprising at least one positive lens and one negative lens and having negative refractive power as a whole. By such configuration, it is possible to correct superbly various aberrations, in particular, spherical aberration, curvature of field and distortion.

Further, in the variable magnification optical system according to the present embodiment, it is preferable that the most object side lens group consists of lens component(s) having negative refractive power. With such configuration, it is possible to correct lateral chromatic aberration superbly. Meanwhile, in order to correct more superbly lateral chromatic aberration, it is more preferable that at least one surface of the lens component having negative refractive power is formed as an aspherical surface. Further, taking productivity in consideration, it is more preferable that an image side surface of a meniscus shaped negative lens component having a convex surface facing the object side is formed with an aspherical surface. Further, since it is not necessary that a positive lens component is disposed in the most object side lens group, the number of lenses can be reduced. Furthermore, since it is not necessary that a positive lens component having a large diameter is disposed at the most object side in the most object side lens group, the diameter of a lens disposed at the most object side in the lens group disposed at the most object side, can be made small, thereby making the variable magnification optical system according to the present embodiment compact in size and light in weight.

Meanwhile, the term "lens component" in the present specification throughout means a single lens or a cemented lens.

Further, in the variable magnification optical system according to the present embodiment, it is preferable that the lens group disposed at the most object side consists of a first lens component having negative refractive power and a second lens component having negative refractive power. With this configuration, it is possible to reduce the number of the lenses and at the same time secure a desired magnification varying ratio. Further, it is possible to correct effectively curvature of field in the wide angle end state and spherical aberration in the telephoto end state.

Further, in the variable magnification optical system according to the present embodiment, it is preferable that the lens group disposed at the most object side comprises a first lens component having negative refractive power and a second lens component having negative refractive power and that the second lens component consists of a cemented lens constructed by a negative lens cemented with a positive lens.

Further, in the variable magnification optical system according to the present embodiment, it is preferable that the lens group disposed at the most object side comprises at least one plastic lens having at least one surface formed with an aspherical surface and at least one glass lens disposed at an image side of the said plastic lens.

Further, in the variable magnification optical system according to the present embodiment, it is preferable that the lens group disposed at the most object side comprises a first lens component having negative refractive power and a second lens component having negative refractive power and that the first lens component is formed with an aspherical surface of resin material on an image side surface of the glass lens.

Further, in the variable magnification optical system according to the present embodiment, it is preferable that, upon varying magnification, the second lens group, the fourth lens group and the sixth lens group are moved in a body.

Further, in the variable magnification optical system according to the present embodiment, it is preferable that at least one lens component in the second lens group is moved to have a component in a direction perpendicular to the optical axis. With this configuration, it is possible to correct image blur caused by a camera shake, vibration or the like, that is, to conduct vibration reduction. Further, it is possible to correct effectively and efficiently variation in curvature of field upon varying magnification.

Further, in the variable magnification optical system according to the present embodiment, it is preferable that at least one of the first lens group and the most image side lens group has aspherical surface(s). With this configuration, it is possible to correct coma aberration.

Further, in the variable magnification optical system according to the present embodiment, it is preferable that a lens component(s) in the first lens group is(are) formed with an aspherical surface(s). With this configuration, it is possible to correct more effectively curvature of field in the wide angle end state and spherical aberration in the telephoto end state. In particular, in the variable magnification optical system according to the present embodiment, it is preferable that an image side lens surface of the most object side lens in the first lens group is aspherically formed. With this configuration, it is possible to correct distortion, attain cost reduction and downsize the optical system.

Further, it is preferable that the most object side lens in the first lens group is a negative meniscus lens. With this configuration, it is possible to make the diameter of the most front side lens (that is, the diameter of the most object side lens surface) small.

Further, in the variable magnification optical system according to the present embodiment, it is preferable that the first lens group comprises a cemented lens. With this configuration, it is possible to correct effectively coma aberration of each wavelength in the wide angle end state. Further, it is preferable that the cemented lens has, as a whole, meniscus shape which is convex toward the object side or double concave shape. It is preferable that the cemented lens consists of, in order from the object side, a negative lens and a positive lens. It is preferable that the negative lens in the cemented lens is meniscus-shaped. It is preferable that the positive lens in the cemented lens is meniscus-shaped. The more those conditions are satisfied, the less aberrations are generated at the cemented lens. Further, high accuracy for assembling becomes not necessary, so there becomes no waste upon manufacturing.

Further, in the variable magnification optical system according to the present embodiment, it is preferable that the fourth lens group comprises a single lens and a cemented lens. With this configuration, it is possible to correct spherical aberration as well as longitudinal chromatic aberration.

Further, in the variable magnification optical system according to the present embodiment, it is preferable that in the most image side lens group there is a plastic lens. With this configuration, it is possible to reduce manufacturing cost. Further, the plastic lens may be formed with an aspherical surface less expensively, so that coma aberration may be corrected superbly. Meanwhile, in a case where the variable magnification optical system according to the present embodiment is adopted as an interchangeable lens system, it is preferable that the most image side lens that would be apt to easily contact with user is a glass lens that is high in durability in comparison with a plastic lens.

Further, in the variable magnification optical system according to the present embodiment, it is preferable that the third lens group consists of two or less lens components (preferably one lens component). If the third lens group that is a focusing lens group is composed of many lenses, it is easy to correct variations in various aberrations such as spherical aberration as well as curvature of field upon focusing. However, the number of lenses of the third lens group increases, and thereby the entire length of the variable magnification optical system according to the present embodiment increases, so it becomes difficult to make the optical system compact and light in weight. Therefore, in the variable magnification optical system according to the present embodiment the third lens group is composed of two or less lens component only, as a focusing lens group, thereby the number of lenses being able to be decreased. In particular, if the third lens group is composed of a single lens, the number of lenses can be more decreased, so it is preferable. Further, if the focusing lens group is so configured to be moved toward the object side upon focusing from an infinitely distant object to a closely distant object, it is possible to correct more superbly variation in various aberrations such as spherical aberration as well as curvature of field upon focusing.

The optical apparatus of the present embodiment has the variable magnification optical system having such configuration as described above, whereby an optical apparatus having superb optical performance may be realized.

The method for manufacturing the variable magnification optical system according to the present embodiment is a method for manufacturing a variable magnification optical system comprising, in order from an object side: a first lens group having negative refractive power; a second lens group having positive refractive power; a third lens group having negative refractive power; a fourth lens group having positive refractive power; a fifth lens group having negative refractive power; and a sixth lens group having positive refractive power; comprising the steps of:

configuring such that, upon varying magnification, air distances between the neighboring lens groups are varied; and configuring such that the following conditional expression (1) is satisfied:

$$0.30<(-fA)/fB<0.60 \quad (1)$$

where fA denotes a focal length of a lens group disposed at a most object side, and fB denotes a focal length of a lens group disposed at a most image side.

Hereinafter, a variable magnification optical system relating to numerical examples according to the present embodiment will be explained with reference to the accompanying drawings.

First Example

FIG. 1 is a sectional view showing a configuration of a variable magnification optical system in a wide angle end state according to the First Example of the present embodiment. Meanwhile, in FIG. 1, and FIG. 3, FIG. 5, FIG. 7 and FIG. 9 described herein later, arrows show moving trajectory of each lens group upon varying magnification from the wide angle end state (W) to the tele photo end state (T).

The variable magnification optical system according to the present Example is composed of, in order from the object side, a first lens group G1 having negative refractive power; a second lens group G2 having positive refractive power; a third lens group G3 having negative refractive power; a fourth lens group G4 having positive refractive power; a fifth lens group G5 having negative refractive power; and a sixth lens group G6 having positive refractive power. Meanwhile, an aperture stop S is disposed between the fourth lens group G4 and the fifth lens group G5.

The first lens group G1 consists of, in order from the object side, a negative meniscus lens L11 having a convex surface facing the object side and a cemented lens constructed by a negative meniscus lens L12 having a convex surface facing the object side and a positive meniscus lens L13 having a convex surface facing the object side. Meanwhile, the negative meniscus lens L11 is a glass lens, and an image side lens surface of the negative meniscus lens L11 is formed with an aspherical surface made of resin material.

The second lens group G2 consists of a double convex positive lens L21.

The third lens group G3 consists of a negative meniscus lens L31 having a concave surface facing the object side.

The fourth lens group G4 consists of, in order from the object side, a double convex positive lens L41, a cemented lens constructed by a double convex positive lens L42 cemented with a negative meniscus lens L43 having a concave surface facing the object side, and an aperture stop S.

The fifth lens group G5 consists of, in order from the object side, a cemented lens constructed by a positive meniscus lens L51 having a concave surface facing the object side cemented with a double concave negative lens L52.

The sixth lens group G6 consists of, in order from the object side, a positive meniscus lens L61 having a convex surface facing the object side, a positive meniscus lens L62 having a concave surface facing the object side. Meanwhile, the positive meniscus lens L61 is a plastic lens, of which an image side lens surface is an aspherical surface.

In the variable magnification optical system according to the present Example, upon varying magnification from the wide angle end state to the telephoto end state, the first lens group G1 to the sixth lens group G6 are moved along the optical axis such that an air distance between the first lens group G1 and the second lens group G2, an air distance between the second lens group G2 and the third lens group G3, an air distance between the third lens group G3 and the fourth lens group G4, an air distance between the fourth lens group G4 and the fifth lens group G5 and an air distance between the fifth lens group G5 and the sixth lens group G6 are varied. In detail, upon varying magnification, the second, the fourth and the sixth lens groups G2, G4 and G6 are moved together as one body. Meanwhile, upon varying magnification, the aperture stop S is moved together with the fourth lens group G4 as one body.

Further, in the variable magnification optical system according to the present Example, focusing from an infinitely distant object to a closely distant object is carried out by moving the third lens group G3 toward the object side along the optical axis.

Further, in the variable magnification optical system according to the present Example, vibration reduction is conducted by moving the second lens group G2 to have a component in a direction perpendicular to the optical axis.

Table 1 below shows various values of the variable magnification optical system according to the present Example.

In table 1, "f" denotes a focal length, and Bf denotes a back focal length, that is, a distance on the optical axis between the most image side lens surface and the image plane.

In [Surface Data], "m" denotes an order of an optical surface counted from the object side, "r" denotes a radius of curvature, "d" denotes a surface-to-surface distance (an interval from an n-th surface to an (n+1)-th surface, where n is an integer), nd denotes refractive index for d-line (wavelength $\lambda$=587.6 nm) and vd denotes an Abbe number for d-line (wavelength $\lambda$=587.6 nm). Further, OP denotes an object surface, "variable" denotes a variable surface-to-surface distance, and "Stop S" denotes an aperture stop. Meanwhile, radius of curvature r=$\infty$ denotes a plane surface. The position of an aspherical surface is expressed by attaching "*" to the surface number, and in the column of the radius of curvature r, a paraxial radius of curvature is shown.

In [Aspherical Surface Data], with respect to an aspherical surface shown in [Surface Data], an aspherical surface coefficient and a conical coefficient are shown in the case where the aspherical surface is exhibited by the following expression:

$$x=(h^2/r)/[1+[1-\kappa(h/r)^2]^{1/2}]+A4h^4+A6h^6+A8h^8$$

where h denotes a vertical height from the optical axis, x denotes a sag amount which is a distance along the optical axis from the tangent surface at the vertex of the aspherical surface to the aspherical surface at the vertical height h from the optical axis, $\kappa$ denotes a conical coefficient, A4, A6 and A8 denote respective aspherical coefficients, and r denotes a paraxial radius of curvature that is a radius of curvature of a reference sphere. Meanwhile "E-n", where n is an integer, denotes "$\times 10^{-n}$", for example, "1.23456E-07" denotes "1.23456$\times 10^{-7}$". The 2nd order aspherical surface coefficient A2 is 0, and omitted in the description.

In [Various Data], FNO denotes an F-number, 2$\omega$ denotes an angle of view (unit "°"), Y denotes an image height, TL denotes a total length of the variable magnification optical system according to the present Example, that is, a distance along the optical axis from the first surface to the image plane, do denotes a variable interval between an n-th surface and an (n+1)-th surface. Meanwhile, W denotes a wide-angle end state, M denotes an intermediate focal length state, and T denotes a telephoto end state.

In [Lens Group Data], a starting surface number and focal length of respective lens groups are shown.

In [Values for Conditional Expressions], values corresponding to respective conditional expressions of the present Example are shown.

It is noted, here, that "mm" is generally used for the unit of length such as the focal length f, the radius of curvature r and the unit for other lengths shown in Table 1. However, since similar optical performance can be obtained by an optical system proportionally enlarged or reduced its dimension, the unit is not necessarily to be limited to "mm".

The explanation of reference symbols in Table 1 described above, is the same in Tables for the other Examples.

TABLE 1

First Example

[Surface Data]

| m | r | d | nd | vd |
|---|---|---|---|---|
| OP | $\infty$ | | | |
| 1 | 80.72 | 2.00 | 1.58913 | 61.22 |
| 2 | 18.88 | 0.17 | 1.56093 | 36.64 |
| *3 | 17.05 | 9.35 | 1.00000 | |
| 4 | 240.48 | 1.40 | 1.62299 | 58.12 |
| 5 | 17.63 | 5.00 | 1.84666 | 23.80 |
| 6 | 32.74 | variable | 1.00000 | |
| 7 | 164.19 | 1.65 | 1.48749 | 70.31 |
| 8 | −48.23 | variable | 1.00000 | |
| 9 | −30.49 | 0.80 | 1.77250 | 49.62 |
| 10 | −87.64 | variable | 1.00000 | |
| 11 | 46.43 | 3.05 | 1.48749 | 70.31 |
| 12 | −31.99 | 0.10 | 1.00000 | |
| 13 | 25.50 | 4.20 | 1.48749 | 70.31 |
| 14 | −25.50 | 0.80 | 1.84666 | 23.80 |
| 15 | −60.79 | 0.75 | 1.00000 | |
| 16 (Stop S) | $\infty$ | variable | 1.00000 | |
| 17 | −43.88 | 2.27 | 1.75520 | 27.57 |
| 18 | −13.90 | 0.80 | 1.70154 | 41.02 |
| 19 | 38.98 | variable | 1.00000 | |
| 20 | 81.93 | 1.30 | 1.52444 | 56.21 |
| *21 | 91.62 | 1.60 | 1.00000 | |
| 22 | −179.92 | 2.30 | 1.51680 | 63.88 |
| 23 | −21.95 | Bf | 1.00000 | |
| Image Plane | $\infty$ | | | |

[Aspherical Surface Data]

| m | $\kappa$ | A4 | A6 |
|---|---|---|---|
| 3 | 0.0000 | 1.43618E−05 | 3.23919E−08 |

| A8 | A10 |
|---|---|
| −6.25295E−11 | 2.95784E−13 |

| m | $\kappa$ | A4 | A6 |
|---|---|---|---|
| 21 | 0.0000 | 2.43150E−05 | −6.35221E−09 |

| A8 | A10 |
|---|---|
| 2.24760E−10 | −3.95108E−12 |

[Various Data]
Variable magnification ratio 2.89

| | W | M | T |
|---|---|---|---|
| f | 18.50 | 35.00 | 53.40 |
| FNO | 3.64 | 4.62 | 5.88 |
| 2$\omega$ | 80.60 | 45.84 | 30.70 |
| TL | 134.86 | 128.74 | 136.72 |
| Y | 14.25 | 14.25 | 14.25 |
| d6 | 33.51 | 11.32 | 3.41 |
| d8 | 6.23 | 7.18 | 7.40 |
| d10 | 2.96 | 2.00 | 1.78 |
| d16 | 1.70 | 5.67 | 9.57 |
| d19 | 9.07 | 5.10 | 1.20 |
| Bf | 43.85 | 59.92 | 75.82 |

[Lens Group Data]

| Group | Starting Surface | f |
|---|---|---|
| 1 | 1 | −24.58 |
| 2 | 7 | 76.67 |
| 3 | 9 | −60.89 |
| 4 | 11 | 22.86 |
| 5 | 17 | −31.47 |
| 6 | 20 | 46.90 |

TABLE 1-continued

First Example

[Values for Conditional Expression]

(1) (−fA)/fB = 0.52
(2) (−fC)/fB = 0.6711
(3) fD/fB = 0.49

Figure 2B:
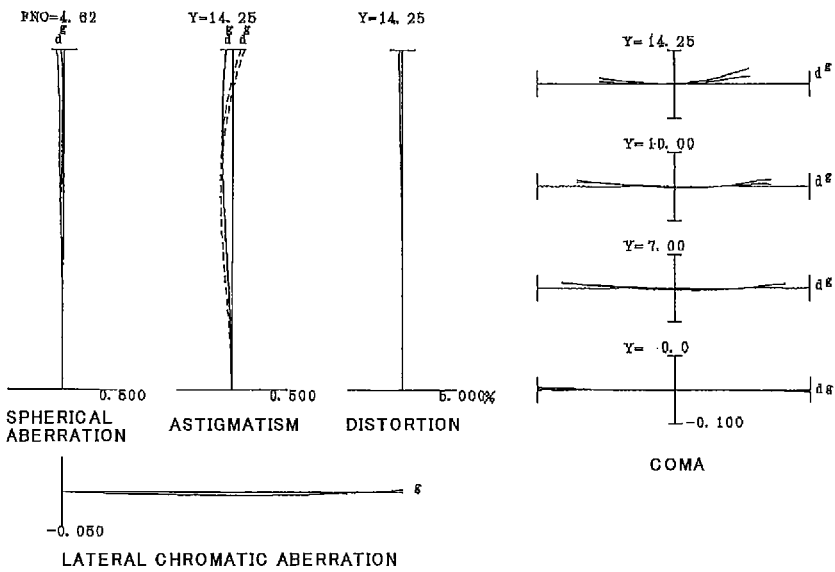
Figure 2C:
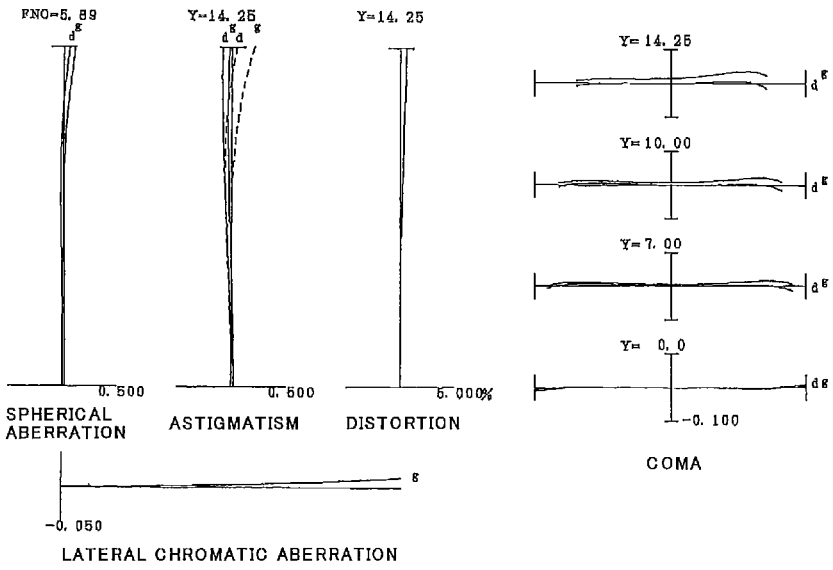

FIGS. 2A, 2B and 2C are graphs showing various aberrations of the variable magnification optical system according to the First Example of the present embodiment upon focusing on an infinitely distant object, in which FIG. 2A is in a wide-angle end state, FIG. 2B is in an intermediate focal length state, and FIG. 2C is in a telephoto end state.

In respective graphs, FNO denotes an F-number, Y denotes an image height. In detail, in the graph of spherical aberration, a value of F-number FNO corresponding to the maximum aperture is shown, and in the graph of astigmatism and the graph of distortion, the maximum values of the image height Y are respectively shown. In the graph of coma aberration, values of respective image heights are shown. In respective graphs, d denotes an aberration curve at d-line (wavelength λ=587.6 nm), and g denotes an aberration curve at g-line (wavelength λ=435.8 nm). In the graph showing astigmatism, a solid line indicates a sagittal image plane, and a broken line indicates a meridional image plane. In the graph of coma aberration, aberration curves at respective image heights Y are shown.

Incidentally, the above-described explanation regarding various aberration graphs is the same with respect to the other Examples.

As is apparent from the respective graphs, the variable magnification optical system according to the present Example shows superb optical performance as a result of good corrections to various aberrations from the wide-angle end state to the telephoto end state.

Second Example

FIG. 3 is a sectional view showing a configuration of a variable magnification optical system in a wide angle end state according to the Second Example of the present embodiment.

The variable magnification optical system according to the present Example is composed of, in order from the object side, a first lens group G1 having negative refractive power; a second lens group G2 having positive refractive power; a third lens group G3 having negative refractive power; a fourth lens group G4 having positive refractive power; a fifth lens group G5 having negative refractive power; and a sixth lens group G6 having positive refractive power. Meanwhile, an aperture stop S is disposed between the fourth lens group G4 and the fifth lens group G5.

The first lens group G1 consists of, in order from the object side, a negative meniscus lens L11 having a convex surface facing the object side and a cemented lens constructed by a double concave negative lens L12 cemented with a positive meniscus lens L13 having a convex surface facing the object side. Meanwhile, the negative meniscus lens L11 is a glass lens, and an image side lens surface of the negative meniscus lens L11 is made of resin material and formed with an aspherical surface.

The second lens group G2 consists of a double convex positive lens L21.

The third lens group G3 consists of a negative meniscus lens L31 having a concave surface facing the object side.

The fourth lens group G4 consists of, in order from the object side, a double convex positive lens L41, and a cemented lens constructed by a double convex positive lens L42 cemented with a negative meniscus lens L43 having a concave surface facing the object side.

The fifth lens group G5 consists of, in order from the object side, an aperture stop S and a cemented lens constructed by a positive meniscus lens L51 having a concave surface facing the object side cemented with a double concave negative lens L52.

The sixth lens group G6 consists of, in order from the object side, a negative meniscus lens L61 having a convex surface facing the object side, and a positive meniscus lens L62 having a concave surface facing the object side. Meanwhile, the negative meniscus lens L61 is a plastic lens, of which an image side lens surface is an aspherical surface.

In the variable magnification optical system according to the present Example, upon varying magnification from the wide angle end state to the telephoto end state, the first lens group G1 to the sixth lens group G6 are moved along the optical axis such that an air distance between the first lens group G1 and the second lens group G2, an air distance between the second lens group G2 and the third lens group G3, an air distance between the third lens group G3 and the fourth lens group G4, an air distance between the fourth lens group G4 and the fifth lens group G5 and an air distance between the fifth lens group G5 and the sixth lens group G6 are varied. In detail, upon varying magnification, the second, the fourth and the sixth lens groups G2, G4 and G6 are moved as one body. Meanwhile, upon varying magnification, the aperture stop S is moved together with the fourth lens group G5 as one body.

Further, in the variable magnification optical system according to the present Example, focusing from an infinitely distant object to a closely distant object is carried out by moving the third lens group G3 toward the object side along the optical axis.

In the variable magnification optical system according to the present Example, vibration reduction is carried out by moving the second lens group G2 to have a component in a direction perpendicular to the optical axis.

Table 2 below shows various values of the variable magnification optical system according to the present Example.

TABLE 2

Second Example

[Surface Data]

| m | r | d | nd | vd |
|---|---|---|---|---|
| OP | ∞ | | | |
| 1 | 58.61 | 1.30 | 1.51680 | 63.88 |
| 2 | 18.70 | 0.15 | 1.56093 | 36.64 |
| *3 | 16.70 | 12.36 | 1.00000 | |
| 4 | −539.76 | 1.20 | 1.63854 | 55.34 |
| 5 | 21.43 | 5.00 | 1.84666 | 23.78 |
| 6 | 43.93 | variable | 1.00000 | |
| 7 | 76.20 | 1.70 | 1.48749 | 70.31 |
| 8 | −74.28 | variable | 1.00000 | |
| 9 | −33.55 | 0.79 | 1.77250 | 49.62 |
| 10 | −126.41 | variable | 1.00000 | |
| 11 | 49.80 | 3.33 | 1.48749 | 70.31 |
| 12 | −30.52 | 0.10 | 1.00000 | |
| 13 | 23.62 | 3.51 | 1.48749 | 70.31 |
| 14 | −29.49 | 0.80 | 1.84666 | 23.80 |
| 15 | −75.25 | variable | 1.00000 | |
| 16 (Stop S) | ∞ | 1.50 | 1.00000 | |
| 17 | −51.95 | 2.42 | 1.75520 | 27.57 |

TABLE 2-continued

Second Example

| | | | | |
|---|---|---|---|---|
| 18 | −15.57 | 0.90 | 1.70154 | 41.02 |
| 19 | 45.98 | variable | 1.00000 | |
| 20 | 96.48 | 1.37 | 1.52444 | 56.21 |
| *21 | 88.50 | 1.50 | 1.00000 | |
| 22 | −58.97 | 2.38 | 1.51680 | 63.88 |
| 23 | −21.70 | Bf | 1.00000 | |
| Image Plane | ∞ | | | |

[Aspherical Surface Data]

| m | κ | A4 | A6 |
|---|---|---|---|
| 3 | 0.0000 | 1.72915E−05 | 4.86464E−08 |

| A8 | A10 |
|---|---|
| −1.24525E−10 | 4.71298E−13 |

| m | κ | A4 | A6 |
|---|---|---|---|
| 21 | 0.0000 | 3.10082E−05 | 1.62502E−09 |

| A8 | A10 |
|---|---|
| −1.14900E−10 | 1.87133E−13 |

[Various Data]
Variable magnification ratio 2.89

| | W | M | T |
|---|---|---|---|
| f | 18.50 | 35.00 | 53.40 |
| FNO | 3.64 | 4.70 | 5.84 |
| 2ω | 80.61 | 45.83 | 30.72 |
| TL | 135.29 | 129.95 | 136.93 |
| Y | 14.25 | 14.25 | 14.25 |
| d6 | 35.50 | 13.00 | 3.00 |
| d8 | 6.10 | 9.67 | 10.06 |
| d10 | 5.11 | 1.55 | 1.15 |
| d15 | 0.95 | 3.60 | 6.50 |
| d19 | 6.85 | 4.20 | 1.30 |
| Bf | 40.47 | 57.64 | 74.61 |

[Lens Group Data]

| Group | Starting Surface | f |
|---|---|---|
| 1 | 1 | −27.41 |
| 2 | 7 | 77.45 |
| 3 | 9 | −59.34 |
| 4 | 11 | 22.44 |
| 5 | 17 | −37.49 |
| 6 | 20 | 67.25 |

[Values for Conditional Expression]

(1) (−fA)/fB = 0.41
(2) (−fC)/fB = 0.56
(3) fD/fB = 0.33

Figure 4A:
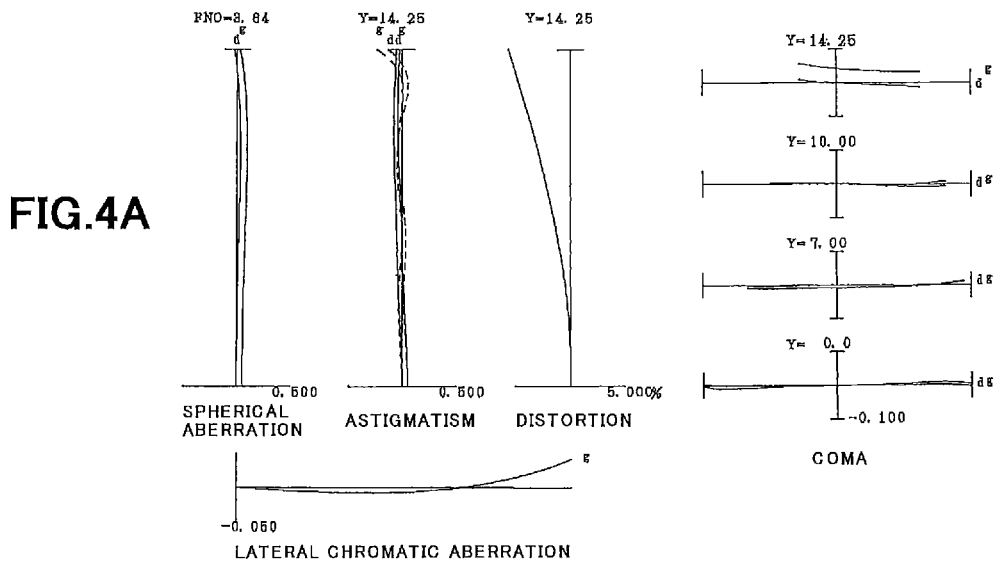
Figure 4B:
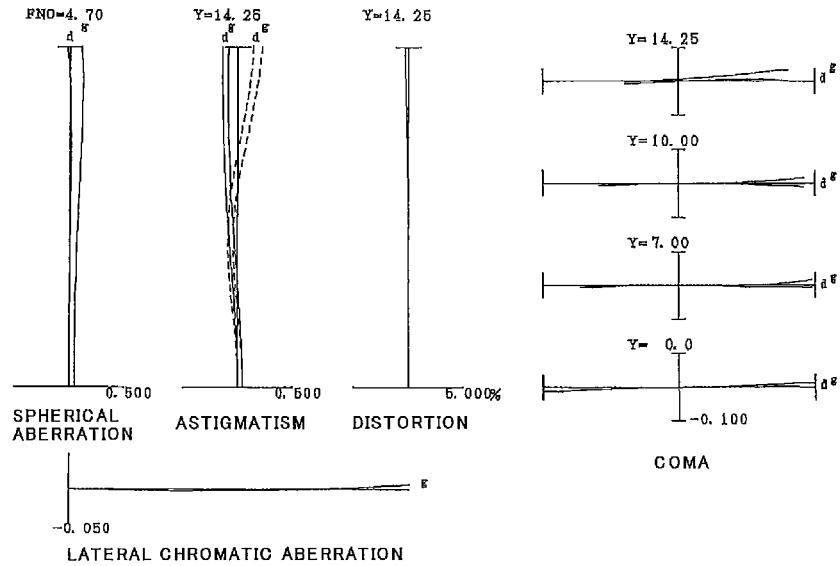
Figure 4C:
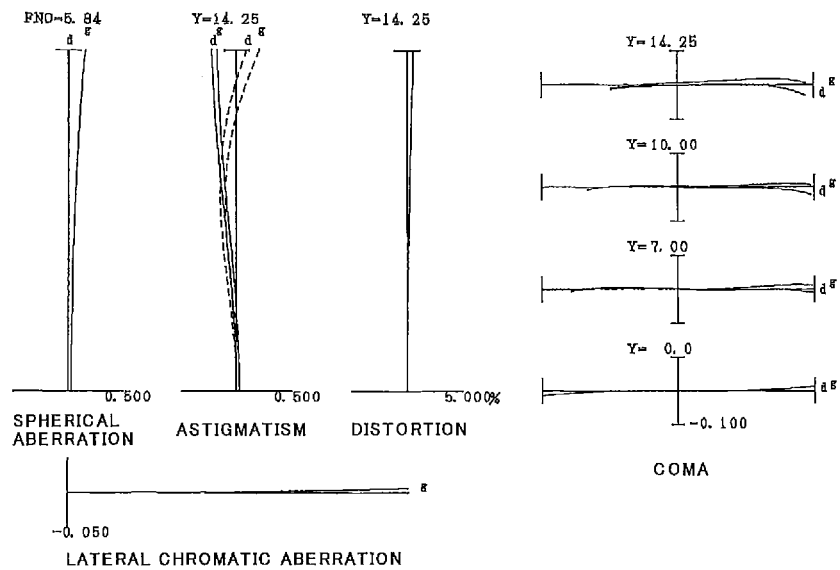

FIGS. 4A, 4B and 4C are graphs showing various aberrations of the variable magnification optical system according to the Second Example of the present embodiment upon focusing on an infinitely distant object, in which FIG. 4A is in a wide-angle end state, FIG. 4B is in an intermediate focal length state, and FIG. 4C is in a telephoto end state.

As is apparent from the respective graphs, the variable magnification optical system according to the present Example shows superb optical performance as a result of good corrections to various aberrations from the wide-angle end state to the telephoto end state.

Third Example

Figure 5:
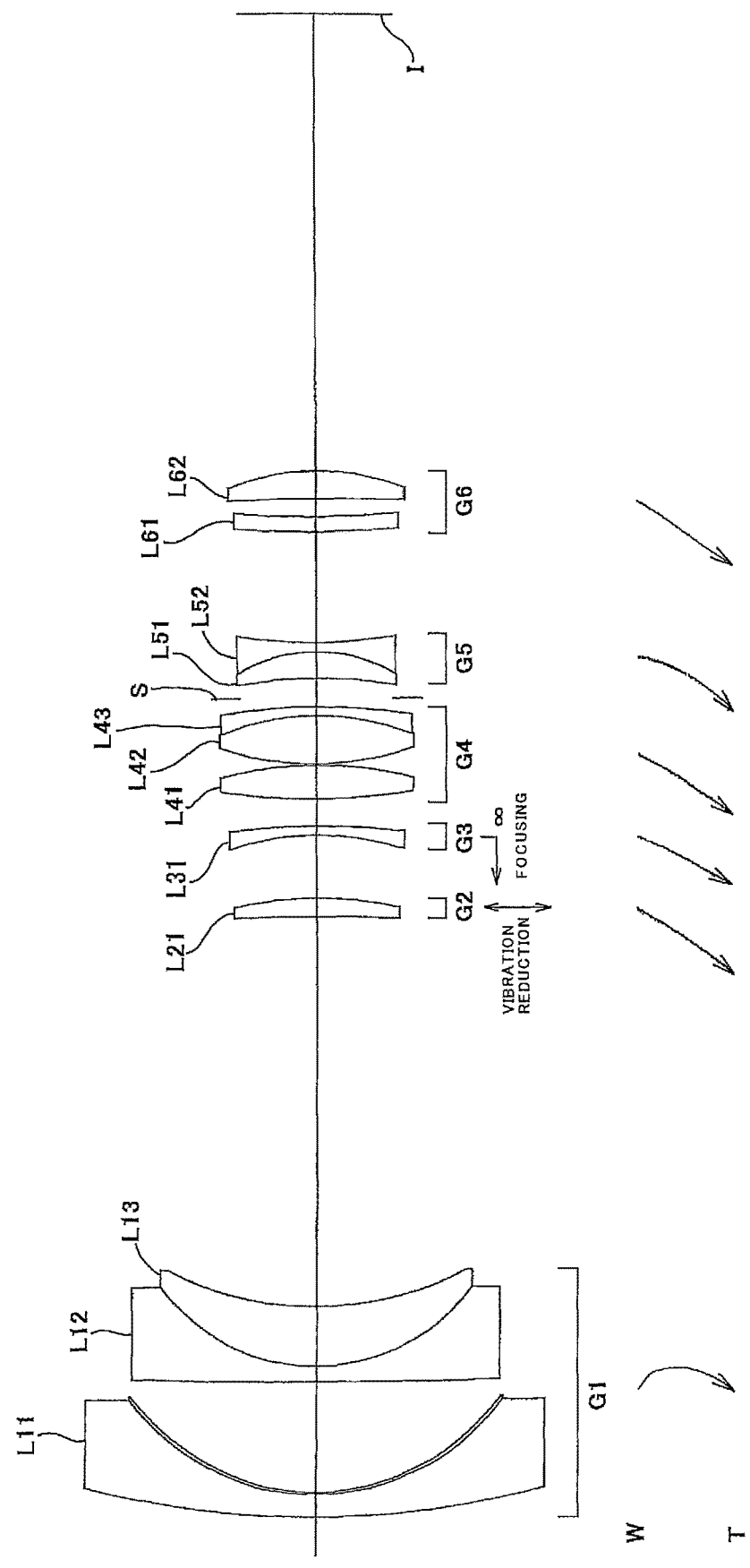
FIG. 5 is a sectional view showing a variable magnification optical system in a wide angle end state according to the Third Example.

FIG. 5 is a sectional view showing a configuration of a variable magnification optical system in a wide angle end state according to the Third Example of the present embodiment.

The variable magnification optical system according to the present Example is composed of, in order from the object side, a first lens group G1 having negative refractive power; a second lens group G2 having positive refractive power; a third lens group G3 having negative refractive power; a fourth lens group G4 having positive refractive power; a fifth lens group G5 having negative refractive power; and a sixth lens group G6 having positive refractive power. Meanwhile, an aperture stop S is disposed between the fourth lens group G4 and the fifth lens group G5.

The first lens group G1 consists of, in order from the object side, a negative meniscus lens L11 having a convex surface facing the object side and a cemented lens constructed by a negative meniscus lens L12 having a convex surface facing the object side cemented with a positive meniscus lens L13 having a convex surface facing the object side. Meanwhile, the negative meniscus lens L11 is a glass lens, and an image side lens surface of the negative meniscus lens L11 is made of resin material and formed with an aspherical surface.

The second lens group G2 consists of a positive meniscus lens L21 having a concave surface facing the object side.

The third lens group G3 consists of a negative meniscus lens L31 having a concave surface facing the object side.

The fourth lens group G4 consists of, in order from the object side, a double convex positive lens L41, a cemented lens constructed by a double convex positive lens L42 cemented with a negative meniscus lens L43 having a concave surface facing the object side, and an aperture stop S.

The fifth lens group G5 consists of a cemented lens constructed by, in order from the object side, a positive meniscus lens L51 having a concave surface facing the object side cemented with a double concave negative lens L52.

The sixth lens group G6 consists of, in order from the object side, a negative meniscus lens L61 having a convex surface facing the object side, and a positive meniscus lens L62 having a concave surface facing the object side. Meanwhile, the negative meniscus lens L61 is a plastic lens, of which an image side lens surface is an aspherical surface.

In the variable magnification optical system according to the present Example, upon varying magnification from the wide angle end state to the telephoto end state, the first lens group G1 to the sixth lens group G6 are moved along the optical axis such that an air distance between the first lens group G1 and the second lens group G2, an air distance between the second lens group G2 and the third lens group G3, an air distance between the third lens group G3 and the fourth lens group G4, an air distance between the fourth lens group G4 and the fifth lens group G5 and an air distance between the fifth lens group G5 and the sixth lens group G6 are varied. Meanwhile, upon varying magnification, the aperture stop S is moved together with the fourth lens group G4 as one body.

Further, in the variable magnification optical system according to the present Example, focusing from an infinitely distant object to a closely distant object is carried out by moving the third lens group G3 toward the object side along the optical axis.

In the variable magnification optical system according to the present Example, vibration reduction is carried out by moving the second lens group G2 to have a component in a direction perpendicular to the optical axis.

Table 3 below shows various values of the variable magnification optical system according to the present Example.

TABLE 3

Third Example

[Surface Data]

| m | r | d | nd | νd |
|---|---|---|---|---|
| OP | ∞ | | | |
| 1 | 79.69 | 2.00 | 1.58913 | 61.22 |
| 2 | 20.75 | 0.17 | 1.56093 | 36.64 |
| *3 | 19.00 | 9.65 | 1.00000 | |
| 4 | 416.05 | 1.40 | 1.60311 | 60.69 |
| 5 | 17.31 | 5.19 | 1.84666 | 23.80 |
| 6 | 28.95 | variable | 1.00000 | |
| 7 | −396.42 | 1.63 | 1.48749 | 70.31 |
| 8 | −34.31 | variable | 1.00000 | |
| 9 | −24.55 | 0.80 | 1.77250 | 49.62 |
| 10 | −67.66 | variable | 1.00000 | |
| 11 | 53.51 | 2.86 | 1.60311 | 60.69 |
| 12 | −36.03 | 0.10 | 1.00000 | |
| 13 | 26.08 | 4.26 | 1.48749 | 70.31 |
| 14 | −23.14 | 0.80 | 1.84666 | 23.80 |
| 15 | −52.27 | 0.75 | 1.00000 | |
| 16 (Stop S) | ∞ | variable | 1.00000 | |
| 17 | −45.51 | 2.28 | 1.84666 | 23.80 |
| 18 | −14.24 | 0.80 | 1.74950 | 35.25 |
| 19 | 41.61 | variable | 1.00000 | |
| 20 | 100.00 | 1.30 | 1.52444 | 56.21 |
| *21 | 97.03 | 1.55 | 1.00000 | |
| 22 | −306.68 | 2.44 | 1.48749 | 70.31 |
| 23 | −21.59 | Bf | 1.00000 | |
| Image Plane | ∞ | | | |

[Aspherical Surface Data]

| m | κ | A4 | A6 |
|---|---|---|---|
| 3 | 0.0000 | 9.56997E−06 | 2.46213E−08 |

| A8 | A10 |
|---|---|
| −3.67381E−11 | 1.68777E−13 |

| m | κ | A4 | A6 |
|---|---|---|---|
| 21 | 0.0000 | 2.66274E−05 | 2.95181E−08 |

| A8 | A10 |
|---|---|
| −8.46694E−11 | −4.35134E−12 |

[Various Data]
Variable magnification ratio 2.89

| | W | M | T |
|---|---|---|---|
| f | 18.50 | 35.00 | 53.40 |
| FNO | 3.64 | 4.60 | 5.88 |
| 2ω | 80.59 | 45.80 | 30.69 |
| TL | 134.92 | 128.32 | 136.32 |
| Y | 14.25 | 14.25 | 14.25 |
| d6 | 33.91 | 11.51 | 3.67 |
| d8 | 5.54 | 6.25 | 6.51 |
| d10 | 2.36 | 1.94 | 1.78 |
| d16 | 1.70 | 5.75 | 9.71 |
| d19 | 9.61 | 5.26 | 1.20 |
| Bf | 43.82 | 59.63 | 75.47 |

TABLE 3-continued

Third Example

[Lens Group Data]

| Group | Starting Surface | f |
|---|---|---|
| 1 | 1 | −24.72 |
| 2 | 7 | 76.93 |
| 3 | 9 | −50.29 |
| 4 | 11 | 21.61 |
| 5 | 17 | −33.17 |
| 6 | 20 | 48.02 |

[Values for Conditional Expressions]

(1) $(-fA)/fB = 0.51$
(2) $(-fC)/fB = 0.69$
(3) $fD/fB = 0.45$

Figure 6A:
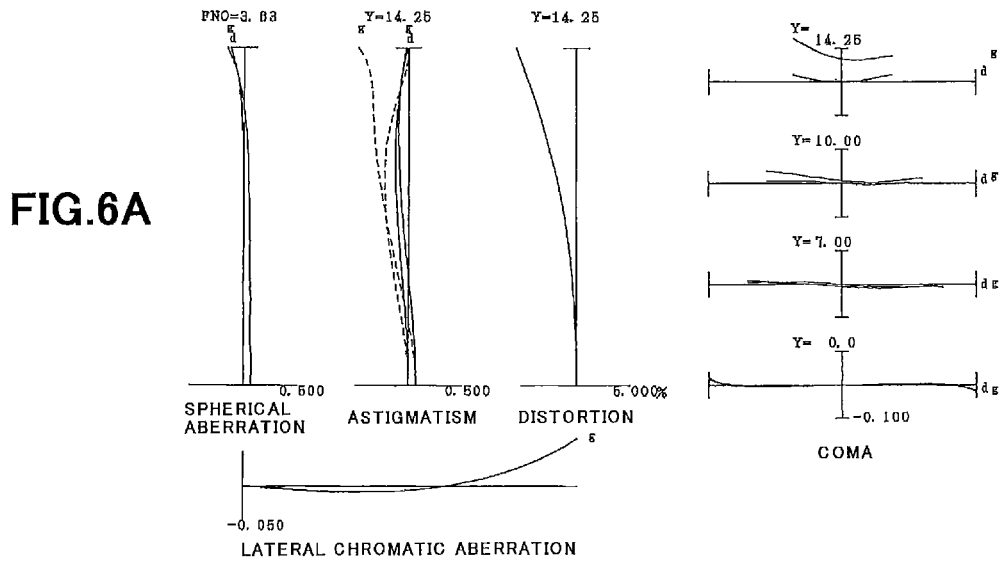
Figure 6B:
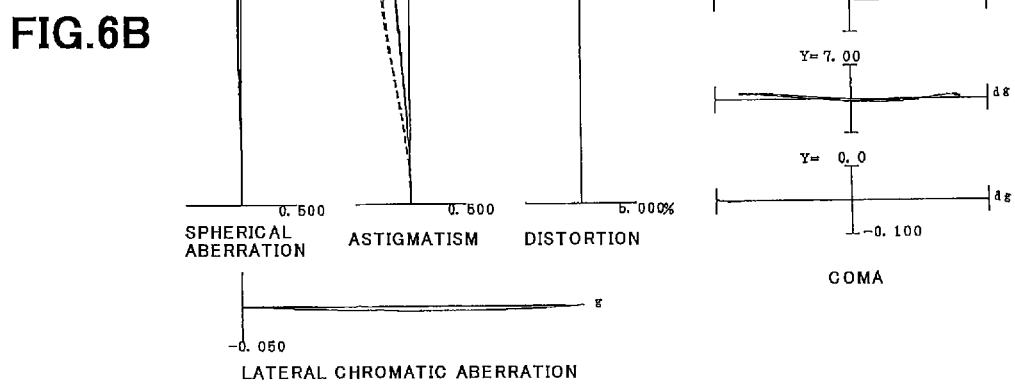
Figure 6C:
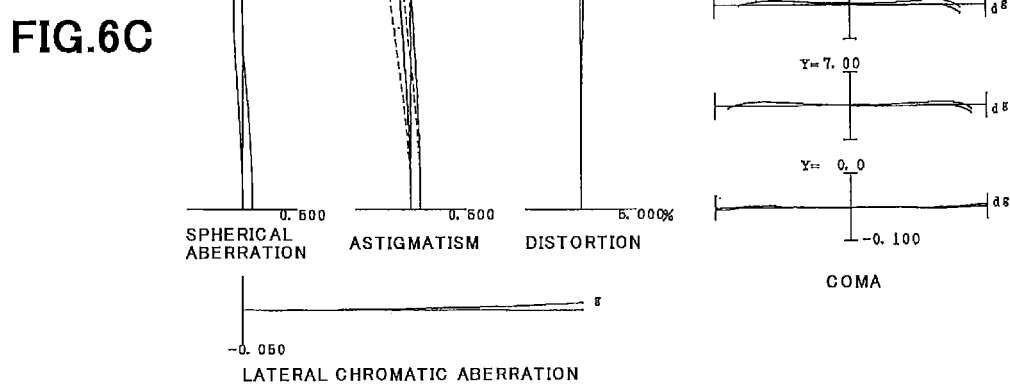

FIGS. 6A, 6B and 6C are graphs showing various aberrations of the variable magnification optical system according to the Third Example of the present embodiment upon focusing on an infinitely distant object, in which FIG. 6A is in a wide-angle end state, FIG. 6B is in an intermediate focal length state, and FIG. 6C is in a telephoto end state.

As is apparent from the respective graphs, the variable magnification optical system according to the present Example shows superb optical performance as a result of good corrections to various aberrations from the wide-angle end state to the telephoto end state.

Fourth Example

Figure 7:
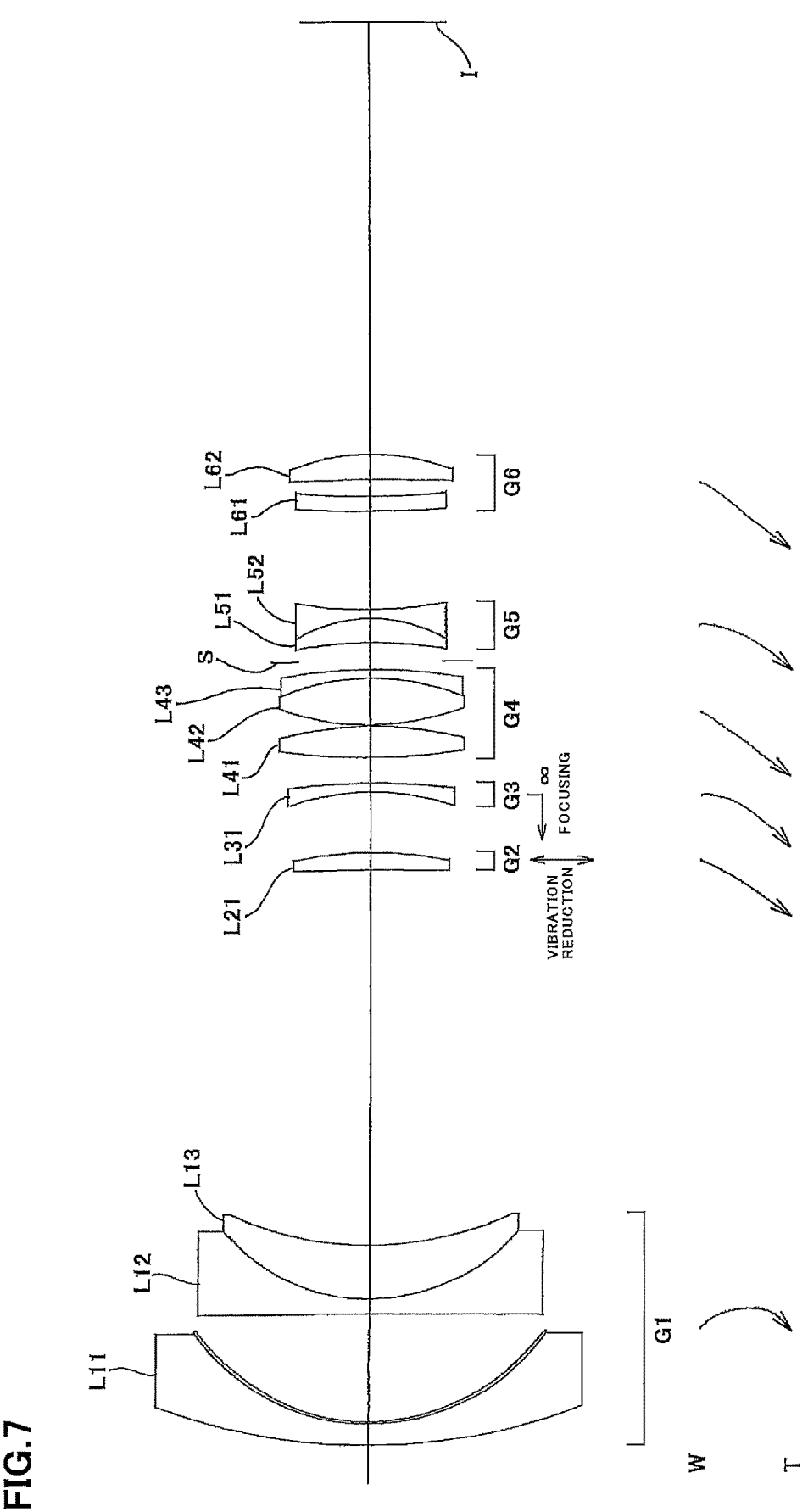
FIG. 7 is a sectional view showing a variable magnification optical system according to the Fourth Example.

FIG. 7 is a sectional view showing a configuration of a variable magnification optical system in a wide angle end state according to the Fourth Example the present embodiment.

The variable magnification optical system according to the present Example is composed of, in order from the object side, a first lens group G1 having negative refractive power; a second lens group G2 having positive refractive power; a third lens group G3 having negative refractive power; a fourth lens group G4 having positive refractive power; a fifth lens group G5 having negative refractive power; and a sixth lens group G6 having positive refractive power. Meanwhile, an aperture stop S is disposed between the fourth lens group G4 and the fifth lens group G5.

The first lens group G1 consists of, in order from the object side, a negative meniscus lens L11 having a convex surface facing the object side and a cemented lens constructed by a double concave negative lens L12 cemented with a positive meniscus lens L13 having a convex surface facing the object side. Meanwhile, the negative meniscus lens L11 is a glass lens, and an image side lens surface of the negative meniscus lens L11 is made of resin material and formed with an aspherical surface.

The second lens group G2 consists of a positive meniscus lens L21 having a concave surface facing the object side.

The third lens group G3 consists of a negative meniscus lens L31 having a concave surface facing the object side.

The fourth lens group G4 consists of, in order from the object side, a double convex positive lens L41, a cemented lens constructed by a double convex positive lens L42 cemented with a negative meniscus lens L43 having a concave surface facing the object side, and an aperture stop S.

The fifth lens group G5 consists of a cemented lens constructed by, in order from the object side, a positive meniscus lens L51 having a concave surface facing the object side cemented with a double concave negative lens L52.

The sixth lens group G6 consists of, in order from the object side, a negative meniscus lens L61 having a convex surface facing the object side, and a positive meniscus lens L62 having a concave surface facing the object side. Meanwhile, the negative meniscus lens L61 is a plastic lens, of which an image side lens surface is an aspherical surface.

In the variable magnification optical system according to the present Example, upon varying magnification from the wide angle end state to the telephoto end state, the first to the sixth lens groups G1 to G6 are moved along the optical axis such that an air distance between the first lens group G1 and the second lens group G2, an air distance between the second lens group G2 and the third lens group G3, an air distance between the third lens group G3 and the fourth lens group G4, an air distance between the fourth lens group G4 and the fifth lens group G5 and an air distance between the fifth lens group G5 and the sixth lens group G6 are varied. Meanwhile, upon varying magnification, the aperture stop S is moved together with the fourth lens group G4 as one body.

In the variable magnification optical system according to the present Example, focusing from an infinitely distant object to a closely distant object is carried out by moving the third lens group G3 toward the object side along the optical axis.

In the variable magnification optical system according to the present Example, vibration reduction is conducted by moving the second lens group G2 to have a component in a direction perpendicular to the optical axis.

Table 4 below shows various values of the variable magnification optical system according to the present Example.

TABLE 4

Fourth Example

[Surface Data]

| m | r | d | nd | νd |
|---|---|---|---|---|
| OP | ∞ | | | |
| 1 | 56.24 | 2.00 | 1.69680 | 55.52 |
| 2 | 20.35 | 0.17 | 1.56093 | 36.64 |
| *3 | 18.69 | 9.97 | 1.00000 | |
| 4 | −2982.47 | 1.40 | 1.60300 | 65.44 |
| 5 | 18.31 | 5.00 | 1.84666 | 23.80 |
| 6 | 32.46 | variable | 1.00000 | |
| 7 | −620.57 | 1.63 | 1.48749 | 70.31 |
| 8 | −35.68 | variable | 1.00000 | |
| 9 | −25.12 | 0.80 | 1.77250 | 49.62 |
| 10 | −71.26 | variable | 1.00000 | |
| 11 | 54.96 | 2.89 | 1.60311 | 60.69 |
| 12 | −35.02 | 0.10 | 1.00000 | |
| 13 | 25.68 | 4.30 | 1.48749 | 70.31 |
| 14 | −23.22 | 0.80 | 1.84666 | 23.80 |
| 15 | −52.65 | 0.75 | 1.00000 | |
| 16 (Stop S) | ∞ | variable | 1.00000 | |
| 17 | −45.18 | 2.27 | 1.84666 | 23.80 |
| 18 | −14.36 | 0.80 | 1.74950 | 35.25 |
| 19 | 41.64 | variable | 1.00000 | |
| 20 | 100.05 | 1.30 | 1.52444 | 56.21 |
| *21 | 80.01 | 1.54 | 1.00000 | |
| 22 | −416.31 | 2.37 | 1.48749 | 70.31 |
| 23 | −21.63 | Bf | 1.00000 | |
| Image Plane | ∞ | | | |

[Aspherical Surface Data]

| m | κ | A4 | A6 |
|---|---|---|---|
| 3 | 0.0000 | 1.09721E−05 | 2.63109E−08 |
| | | A8 | A10 |
| | | −3.94901E−11 | 1.79030E−13 |
| 21 | 0.0000 | 2.64794E−05 | 1.52619E−08 |
| | | A8 | A10 |
| | | 5.85840E−11 | −4.79996E−12 |

[Various Data]
Variable magnification ratio 2.89

| | W | M | T |
|---|---|---|---|
| f | 18.50 | 35.00 | 53.40 |
| FNO | 3.63 | 4.60 | 5.88 |
| 2ω | 80.59 | 45.83 | 30.72 |
| TL | 134.92 | 128.32 | 136.32 |
| Y | 14.25 | 14.25 | 14.25 |
| d6 | 34.40 | 11.79 | 3.56 |
| d8 | 5.58 | 6.27 | 6.52 |
| d10 | 2.36 | 1.87 | 1.82 |
| d15 | 1.70 | 5.48 | 9.09 |
| d19 | 8.98 | 5.00 | 1.20 |
| Bf | 43.82 | 59.84 | 76.07 |

[Lens Group Data]

| Group | Starting Surface | f |
|---|---|---|
| 1 | 1 | −24.76 |
| 2 | 7 | 77.60 |
| 3 | 9 | −50.59 |
| 4 | 11 | 21.42 |
| 5 | 17 | −32.97 |
| 6 | 20 | 49.70 |

[Values for Conditional Expression]

(1) (−fA)/fB = 0.50
(2) (−fC)/fB = 0.66
(3) fD/fB = 0.43

Figure 8A:
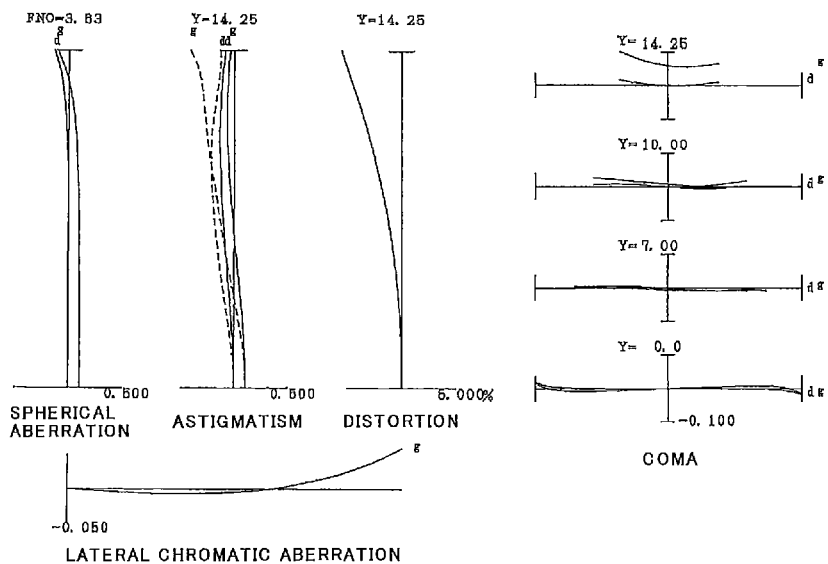
Figure 8B:
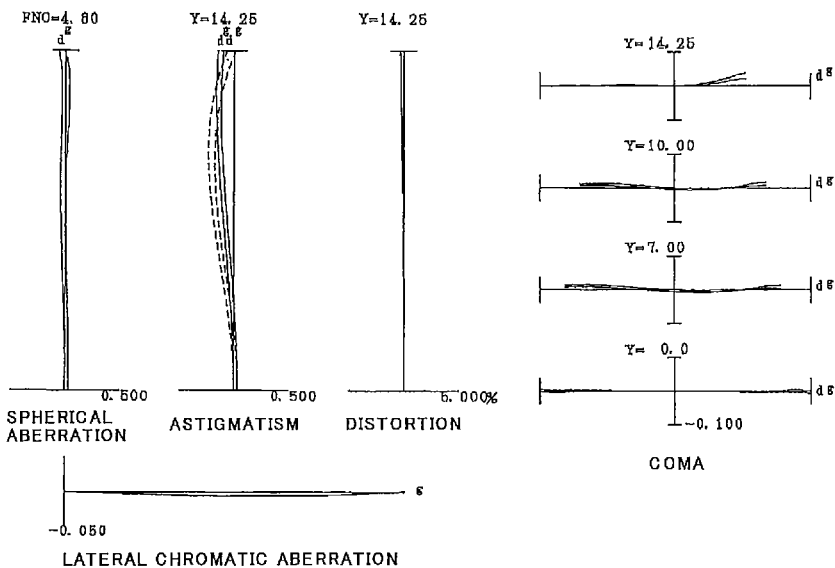
Figure 8C:
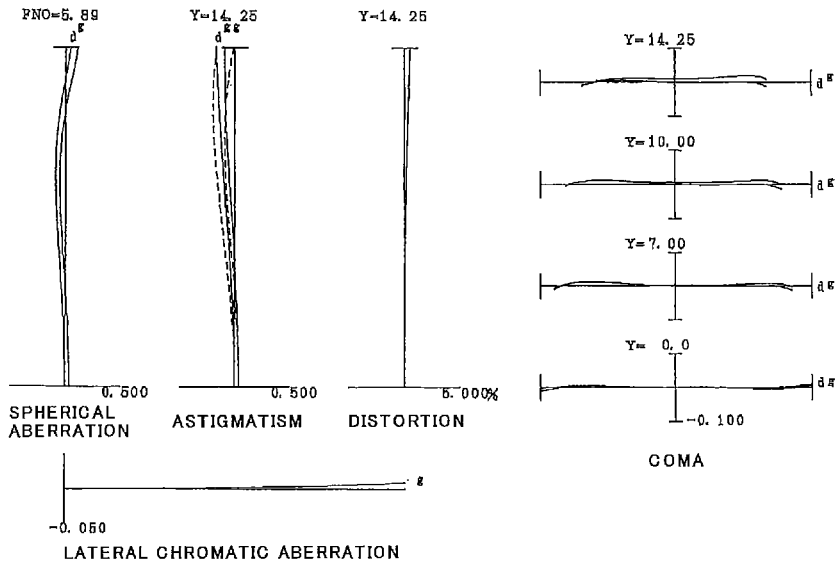
FIG. 8C shows various aberrations in a telephoto end state.

FIGS. 8A, 8B and 8C are graphs showing various aberrations of the variable magnification optical system according to the Fourth Example of the present embodiment upon focusing on an infinitely distant object, in which FIG. 8A is in a wide-angle end state, FIG. 8B is in an intermediate focal length state, and FIG. 8C is in a telephoto end state.

As is apparent from the respective graphs, the variable magnification optical system according to the present Example shows superb optical performance as a result of good corrections to various aberrations from the wide-angle end state to the telephoto end state.

Fifth Example

FIG. 9 is a sectional view showing a configuration of a variable magnification optical system in a wide angle end state according to the Fifth Example of the present embodiment.

The variable magnification optical system according to the present Example is composed of, in order from the object side, a first lens group G1 having negative refractive power; a second lens group G2 having positive refractive power; a third lens group G3 having negative refractive power; a fourth lens group G4 having positive refractive power; a fifth lens group G5 having negative refractive power; and a sixth lens group G6 having positive refractive power. Meanwhile, an aperture stop S is disposed between the fourth lens group G4 and the fifth lens group G5.

The first lens group G1 consists of, in order from the object side, a negative meniscus lens L11 having a convex surface facing the object side, a negative meniscus lens L12 having a convex surface facing the object side and a cemented lens constructed by a negative meniscus lens L13 having a convex surface facing the object side cemented with a positive meniscus lens L14 having a convex surface facing the object side. Meanwhile, the negative meniscus lens L12 is a glass lens, and an image side lens surface of the negative meniscus lens L12 is made of resin material and formed with an aspherical surface.

The second lens group G2 consists of a double convex positive lens.

The third lens group G3 consists of a negative meniscus lens L31 having a concave surface facing the object side.

The fourth lens group G4 consists of, in order from the object side, a double convex positive lens L41, a cemented lens constructed by a double convex positive lens L42 cemented with a negative meniscus lens L43 having a concave surface facing the object side, and an aperture stop S.

The fifth lens group G5 consists of a cemented lens constructed by, in order from the object side, a positive meniscus lens L51 having a concave surface facing the object side cemented with a double concave negative lens L52.

The sixth lens group G6 consists of, in order from the object side, a positive meniscus lens L61 having a convex surface facing the object side and a positive meniscus lens L62 having a concave surface facing the object side. Meanwhile, the positive meniscus lens L61 is a plastic lens, of which an image side lens surface is an aspherical surface.

In the variable magnification optical system according to the present Example, upon varying magnification from the wide angle end state to the telephoto end state, the first to the sixth lens groups G1 to G6 are moved along the optical axis such that an air distance between the first lens group G1 and the second lens group G2, an air distance between the second lens group G2 and the third lens group G3, an air distance between the third lens group G3 and the fourth lens group G4, an air distance between the fourth lens group G4 and the fifth lens group G5 and an air distance between the fifth lens group G5 and the sixth lens group G6 are varied. Meanwhile, upon varying magnification, the aperture stop S is moved together with the fourth lens group G4 as one body.

In the variable magnification optical system according to the present Example, focusing from an infinitely distant object to a closely distant object is carried out by moving the third lens group G3 toward the object side along the optical axis.

In the variable magnification optical system according to the present Example, vibration reduction is carried out by moving the second lens group G2 to have a component in a direction perpendicular to the optical axis.

Table 5 below shows various values of the variable magnification optical system according to the present Example.

TABLE 5

Fourth Example

[Surface Data]

| m | r | d | nd | vd |
|---|---|---|---|---|
| OP | ∞ | | | |
| 1 | 209.27 | 1.20 | 1.58913 | 61.22 |
| 2 | 80.00 | 0.50 | 1.00000 | |

TABLE 5-continued

Fourth Example

| | | | | |
|---|---|---|---|---|
| 3 | 95.02 | 1.50 | 1.58913 | 61.22 |
| 4 | 20.08 | 0.17 | 1.56093 | 36.64 |
| *5 | 17.11 | 8.89 | 1.00000 | |
| 6 | 88.50 | 1.40 | 1.62299 | 58.12 |
| 7 | 20.90 | 4.97 | 1.84666 | 23.80 |
| 8 | 39.72 | variable | 1.00000 | |
| 9 | 91.28 | 1.69 | 1.48749 | 70.31 |
| 10 | −64.46 | 7.40 | 1.00000 | |
| 11 | −31.66 | 0.80 | 1.77250 | 49.62 |
| 12 | −113.87 | variable | 1.00000 | |
| 13 | 45.03 | 2.87 | 1.60311 | 60.69 |
| 14 | −44.31 | 0.10 | 1.00000 | |
| 15 | 28.29 | 4.12 | 1.48749 | 70.31 |
| 16 | −25.69 | 0.80 | 1.84666 | 23.80 |
| 17 | −63.83 | 0.75 | 1.00000 | |
| 18 (Stop S) | ∞ | variable | 1.00000 | |
| 19 | −76.88 | 2.44 | 1.80518 | 25.45 |
| 20 | −14.69 | 0.80 | 1.74950 | 35.25 |
| 21 | 39.81 | variable | 1.00000 | |
| 22 | 87.75 | 1.30 | 1.52444 | 56.21 |
| *23 | 100.00 | 1.63 | 1.00000 | |
| 24 | −130.16 | 2.10 | 1.48749 | 70.31 |
| 25 | −24.08 | Bf | 1.00000 | |
| Image Plane | ∞ | | | |

[Aspherical Surface Data]

| m | κ | A4 | A6 |
|---|---|---|---|
| 5 | 0.0000 | 7.02973E−06 | 1.53750E−08 |

| A8 | A10 |
|---|---|
| −2.66094E−11 | 4.94903E−14 |

| m | κ | A4 | A6 |
|---|---|---|---|
| 23 | 0.0000 | 2.52535E−05 | 1.69828E−07 |

| A8 | A10 |
|---|---|
| −4.24774E−09 | 3.75173E−11 |

[Various Data]
Variable magnification ratio 2.89

| | W | M | T |
|---|---|---|---|
| f | 18.50 | 35.00 | 53.40 |
| FNO | 3.62 | 4.60 | 5.88 |
| 2ω | 80.59 | 45.89 | 30.76 |
| TL | 136.32 | 128.16 | 135.63 |
| Y | 14.25 | 14.25 | 14.25 |
| d8 | 37.04 | 12.65 | 3.40 |
| d10 | 6.41 | 7.23 | 7.40 |
| d12 | 3.03 | 1.94 | 1.78 |
| d18 | 1.70 | 5.44 | 9.04 |
| d21 | 8.27 | 4.81 | 1.20 |
| Bf | 43.82 | 59.84 | 76.07 |

[Lens Group Data]

| Group | Starting Surface | f |
|---|---|---|
| 1 | 1 | −26.43 |
| 2 | 9 | 77.78 |
| 3 | 11 | −57.00 |
| 4 | 13 | 23.44 |
| 5 | 19 | −38.79 |
| 6 | 22 | 58.02 |

[Values for Conditional Expression]

(1) (−fA)/fB = 0.46
(2) (−fC)/fB = 0.6686
(3) fD/fB = 0.40

Figure 10A:
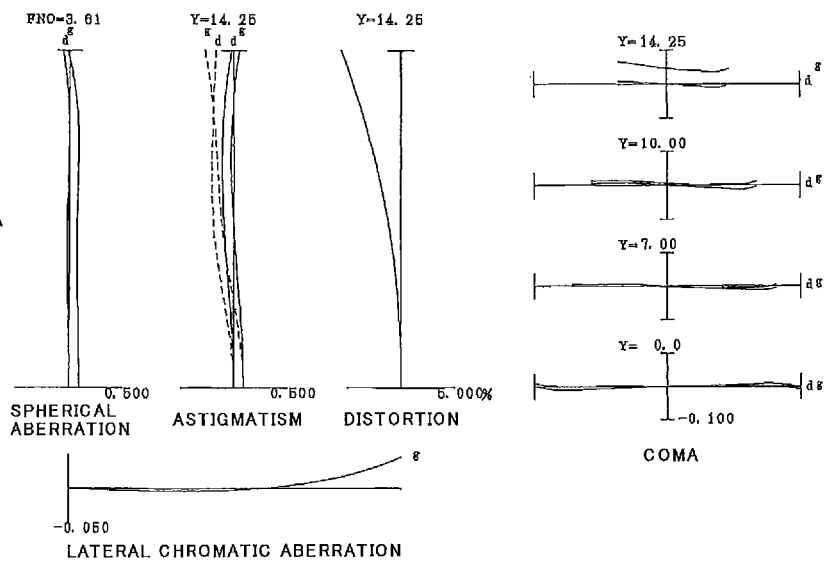
Figure 10B:
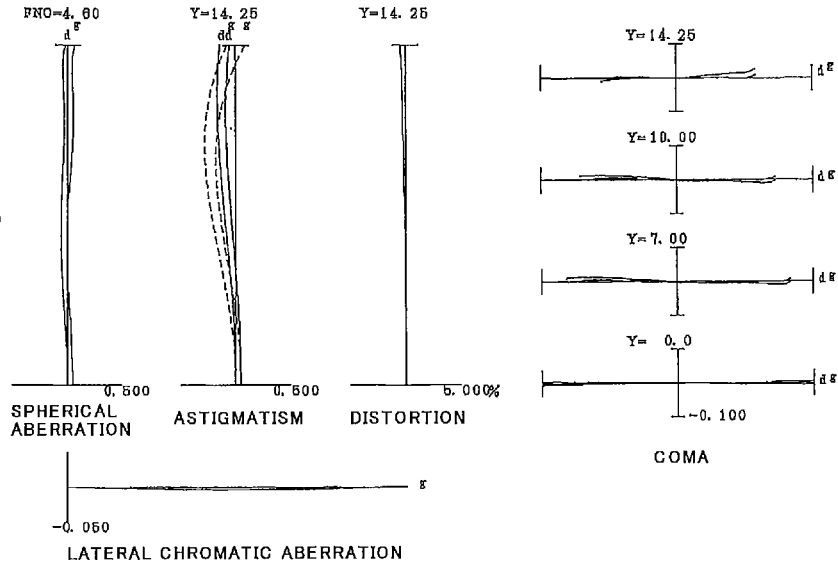
Figure 10C:
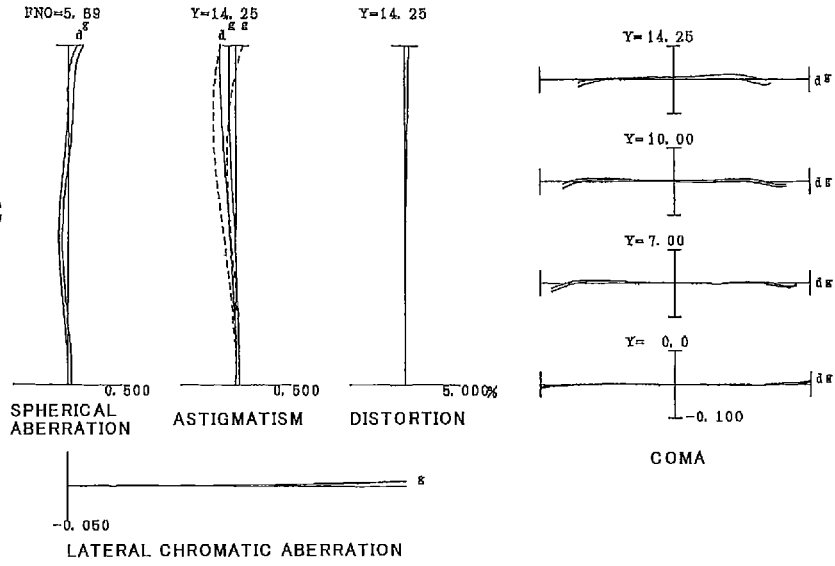

FIGS. 10A, 10B and 10C are graphs showing various aberrations of the variable magnification optical system according to the Fifth Example of the present embodiment upon focusing on an infinitely distant object, in which FIG. 10A is in a wide-angle end state, FIG. 10B is in an intermediate focal length state, and FIG. 10C is in a telephoto end state.

As is apparent from the respective graphs, the variable magnification optical system according to the present Example shows good corrections to various aberrations from the wide-angle end state through the telephoto end state, and also shows a high optical performance.

According to the Examples as above-mentioned, it is possible to realize a small-sized and light in weight variable magnification optical system by which variation in aberrations is restrained upon varying magnification and which has an excellent imaging performance.

Note that each of the above described Examples is a concrete example of the present embodiment, and the present embodiment is not limited to them. The contents described below can be adopted without deteriorating an optical performance of the variable magnification optical systems of the present embodiment.

Although the variable magnification optical systems each having six group configuration were illustrated above as numerical examples of the variable magnification optical systems of the present embodiment, the present embodiment is not limited to them and the variable magnification optical systems having other configurations (such as seven group configuration and the like) can be configured. Concretely, a lens configuration that a lens or a lens group is added to the most object side or the most image side of the variable magnification optical system of each Example described above is possible. Further, a configuration that the most image side lens group of the variable magnification optical system of each Example described above may be composed of two parts separated such that a space therebetween is varied upon varying magnification.

Further, in the variable magnification optical system according to each Example described above, the respective lens groups can be moved in the direction of the optical axis upon varying magnification from the wide angle end state to the telephoto end state. However, in the variable magnification optical system according to each Example described above, the position of at least one lens group, for example, the position of the most image side lens group may be fixed. Further, it is preferable that a trajectory of movement of the first lens group upon varying magnification from the wide angle end state to the telephoto end state, is in the shape of U such that the first lens group is at first moved toward the image side and then toward the object side. Furthermore, if the movement trajectories of the lens groups which are not neighboring to each other are made to be same, it is possible to link the plurality of the lens groups to move those lens groups in a body. By linking the plurality of the lens groups to move in a body, it becomes possible to simplify a lens group holing structure in a lens barrel, this contributing to attaining a small sized structure.

Further, in the variable magnification optical system according to each Example described above, distances between the neighboring lens groups may be reduced further. By reducing further distances between the neighboring lens groups, portability of the lens system may be improved. In the variable magnification optical system according to each Example described above, it is preferable that distance between the first lens group and the second lens group which distance is the largest among distances between the neighboring lens groups, is reduced.

Further, in the variable magnification optical system according to each Example described above, a portion of any lens group, a lens group in the entirety thereof or a plurality of lens groups can be moved as a focusing lens group. In particular, it is desirable that, in the variable magnification optical system according to each Example described above, the third lens group is made to be a focusing lens group. The focusing lens group can be used for auto focus, and suitable for being driven by a motor for auto focus such as an ultrasonic motor.

Further, in the variable magnification optical system according to each Example described above, any lens group in the entirety thereof or a portion thereof can be so moved, as a vibration reduction lens group, to have a component in a direction perpendicular to the optical axis, or rotationally moved (swayed) in an intra-plane direction including the optical axis to carry out vibration reduction. Particularly, in the variable magnification optical system according to each Example described above, it is preferable that the second lens group is used as a vibration reduction lens group. Meanwhile, in the variable magnification optical system according to each Example described above, the fifth lens group may be used as a vibration lens group.

Further, the lens surface(s) of the lenses configuring the variable magnification optical system according to each Example described above, may be a spherical surface, a plane surface, or an aspherical surface. When a lens surface is a spherical surface or a plane surface, lens processing, assembling and adjustment become easy, and it is possible to prevent deterioration in optical performance caused by errors in lens processing, assembling and adjustment, so that it is preferable. Moreover, even if an image plane is shifted, deterioration in representation performance is little, so that it is preferable. When a lens surface is an aspherical surface, the aspherical surface may be fabricated by a grinding process, a glass molding process that a glass material is formed into an aspherical shape by a mold, or a compound type process that a resin material on a glass lens surface is formed into an aspherical shape. A lens surface may be a diffractive optical surface, and a lens may be a graded-index type lens (GRIN lens) or a plastic lens.

Further, in the variable magnification optical system according to each Example described above, it is preferable that an aperture stop is disposed between the fourth lens group and the fifth lens group, and the function may be substituted by a lens frame without disposing a member as an aperture stop.

Moreover, the lens surface(s) of the lenses configuring the variable magnification optical systems according to each Example described above, may be coated with anti-reflection coating(s) having a high transmittance in a broad wavelength range. With this contrivance, it is feasible to reduce a flare as well as ghost and attain a high optical performance with high contrast. In particular, it is preferable that, in the variable magnification optical systems according to each Example described above, the object side lens surface(s) of the lenses in the most object side lens group is (are) coated with anti-reflection coating(s).

Next, a camera equipped with the variable magnification optical system according to the embodiment of the present application, will be explained with referring to FIG. 11.

Figure 11:
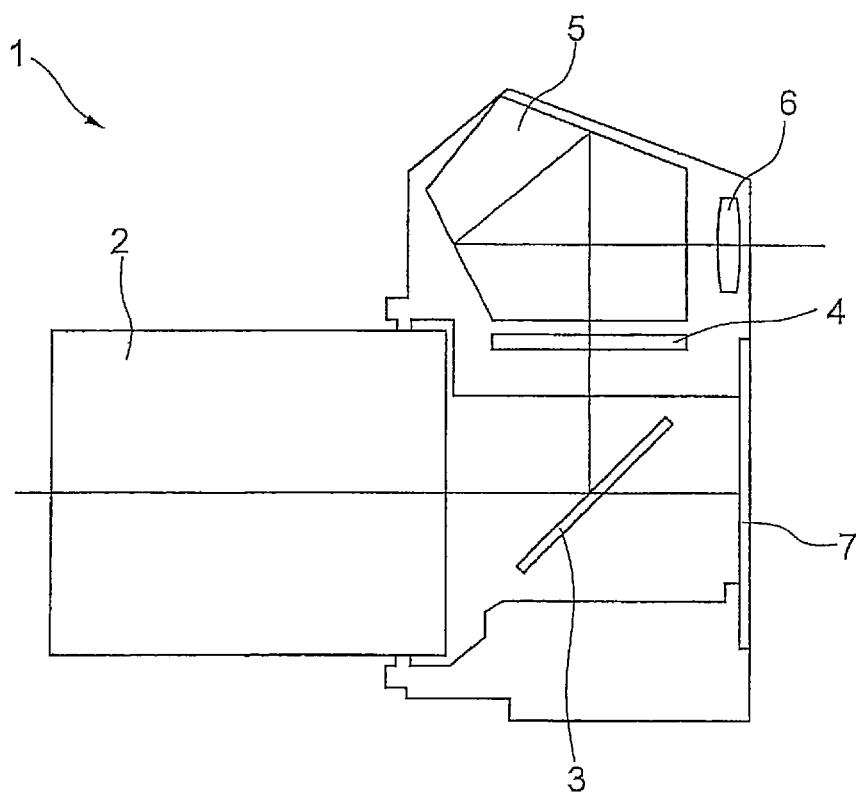
FIG. 11 is a view showing a configuration of a camera equipped with the variable magnification optical system.

FIG. 11 shows a configuration of a camera equipped with the variable magnification optical system according to the embodiment of the present application.

The present camera 1 is a lens changeable type single-lens reflex digital camera equipped with the variable magnification optical system according to the first Example as an imaging lens 2.

In the present camera 1, light emitted from an unillustrated object is converged by the imaging lens 2, reflected by a quick return mirror 3, and focused on a focusing screen 4. The light focused on the focusing screen 4 is reflected a plurality of times in a pentagonal roof prism 5, and is led to an eyepiece 6. Accordingly, a photographer can observe the object image as an erected image through the eyepiece 6.

When the photographer presses an unillustrated release button down, the quick return mirror 3 is retracted out of the optical path, and the light from the unillustrated object reaches an imaging device 7. Accordingly, the light emitted from the object is captured by the imaging device 7 and stored in an unillustrated memory as a photographed image of the object. In this manner, the photographer can take a picture of an object by the camera 1.

The variable magnification optical system according to the first Example installed as the imaging lens 2 in the camera 1, is compact and has excellent optical performances, as described above. In other words, it is possible to realize a camera 1 that is compact and has excellent optical performance. Incidentally, even if a variable magnification optical system according to each of the second to the fifth Examples is installed as an imaging lens 2 in a camera, the same effect as the camera 1 can be obtained.

Further, even if a variable magnification optical system according to each of the Examples is installed in a camera, which does not include a quick return mirror 3, the same effect as the above described camera 1 can be obtained.

Figure 12:
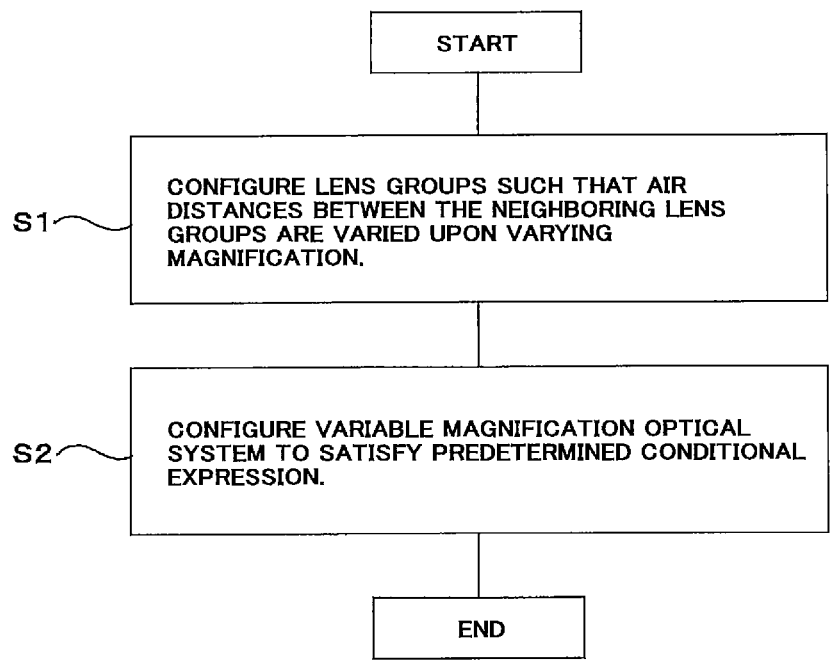
FIG. 12 is a flowchart schematically explaining a method for manufacturing the variable magnification optical system.

Finally, an outline of a method for manufacturing a variable magnification optical system according to the embodiment of the present application, is described with referring to FIG. 12.

FIG. 12 is a flowchart showing an outline of a method for manufacturing a variable magnification optical system according to the embodiment of the present application.

The method for manufacturing the variable magnification optical system according to the present embodiment shown in FIG. 12, is a method for manufacturing a variable magnification optical system, comprising, in order from an object side: a first lens group having negative refractive power; a second lens group having positive refractive power; a third lens group having negative refractive power; a fourth lens group having positive refractive power; a fifth lens group having negative refractive power; and a sixth lens group having positive refractive power; comprising the following steps S1 and S2:

Step S1: preparing the first to the sixth lens groups, and disposing the respective lens groups in order from the object side in a lens barrel. Providing a known movement mechanism in the lens barrel such that air distances between the neighboring lens groups are varied upon varying magnification.

Step S2: configuring such that the following conditional expression (1) is satisfied:

$$0.30 < (-fA)/fB < 0.60 \quad (1)$$

where fA denotes a focal length of a lens group disposed at a most object side, and fB denotes a focal length of a lens group disposed at a most image side.

Thus, the method for manufacturing a variable magnification optical system according to the present embodiment makes it possible to manufacture a variable magnification optical system which is compact and has excellent optical performance.

What is claimed is:

1. A variable magnification optical system comprising, in order from an object side: a first lens group having negative refractive power; a second lens group having positive refractive power; a third lens group having negative refractive power; a fourth lens group having positive refractive power; a fifth lens group having negative refractive power; and a sixth lens group having positive refractive power;

upon varying magnification, air distances between the neighboring lens groups being varied; and the following conditional expressions being satisfied:

$$0.30 < (-fA)/fB < 0.60$$

$$0.20 < fD/fB < 0.50$$

where fA denotes a focal length of a lens group disposed at a most object side, fB denotes a focal length of a lens group disposed at a most image side, and fD denotes a focal length of a third lens group counted from the image side.

2. The variable magnification optical system according to claim 1, wherein the following conditional expression is satisfied:

$$0.40 < (-fC)/fB < 0.72$$

where fC denotes a focal length of a second lens group counted from the image side.

3. The variable magnification optical system according to claim 1, wherein the third lens group is moved upon focusing.

4. The variable magnification optical system according to claim 1, wherein the lens group disposed at the most object side consists of lens component(s) having negative refractive power.

5. The variable magnification optical system according to claim 1, wherein the lens group disposed at the most object side consists of a first lens component having negative refractive power and a second lens component having negative refractive power.

6. The variable magnification optical system according to claim 1, wherein the lens group disposed at the most object side comprises a first lens component having negative refractive power and a second lens component having negative refractive power, and the second lens component consists of a cemented lens constructed by a negative lens cemented with a positive lens.

7. The variable magnification optical system according to claim 1, wherein the lens group disposed at the most image side comprises at least one plastic lens having at least one surface formed with an aspherical surface and at least one glass lens disposed at an image side of said plastic lens.

8. The variable magnification optical system according to claim 1, wherein the lens group disposed at the most object side comprises a first lens component having negative refractive power and a second lens component having negative refractive power and the first lens component is formed with an aspherical surface of resin material at an image side surface of a glass lens.

9. The variable magnification optical system according to claim 1, wherein, upon varying magnification, the second lens group, the fourth lens group and the sixth lens group are moved in a body.

10. The variable magnification optical system according to claim 1, wherein at least one lens component in the second lens group is moved to have a movement component in a direction perpendicular to the optical axis.

11. An optical apparatus equipped with the variable magnification optical system according to claim 1.

12. The variable magnification optical system according to claim 1, wherein the lens group disposed at the most object side comprises a cemented lens consisting of a negative lens cemented with a positive lens.

13. The variable magnification optical system according to claim 1, wherein the lens group disposed at the most object side includes a positive lens.

14. The variable magnification optical system according to claim 1, wherein the lens group disposed at the most object side consists of three lenses.

15. The variable magnification optical system according to claim 1, wherein the lens group disposed at the most image side consists of two lenses.

16. The variable magnification optical system according to claim 1, wherein upon varying magnification, the lens group disposed at the most object side, is moved once toward image side and then toward the object side.

17. The variable magnification optical system according to claim 1, wherein upon varying magnification, the second lens group is moved toward the object side.

18. A variable magnification optical system comprising, in order from an object side: a first lens group having negative refractive power; a second lens group having positive refractive power; a third lens group having negative refractive power; a fourth lens group having positive refractive power; a fifth lens group having negative refractive power; and a sixth lens group having positive refractive power;

upon varying magnification, air distances between the neighboring lens groups being varied; and the following conditional expression being satisfied:

$$0.30 < (-fA)/fB < 0.60 \leq 0.52$$

where fA denotes a focal length of a lens group disposed at a most object side, and fB denotes a focal length of a lens group disposed at a most image side.

19. A method for manufacturing a variable magnification optical system comprising, disposing in order from an object side: a first lens group having negative refractive power, a second lens group having positive refractive power, a third lens group having negative refractive power, a fourth lens group having positive refractive power, a fifth lens group having negative refractive power, and a sixth lens group having positive refractive power; and arranging the lens groups such that upon varying magnification, air distances between the neighboring lens groups are varied;

the method further comprising at least one of the following features (A) or (B):

(A) satisfying the following conditional expressions:

$$0.30 < (-fA)/fB < 0.60$$

$$0.20 < fD/fB < 0.50$$

where fA denotes a focal length of a lens group disposed at a most object side, fB denotes a focal length of a lens group disposed at a most image side, and fD denotes a focal length of a third lens group counted from the image side, (B) satisfying the following conditional expression:

$$0.30 < (-fA)/fB \leq 0.52$$

where fA denotes a focal length of a lens group disposed at the most object side, and fB denotes a focal length of a lens group disposed at the most image side.

* * * * *